US012380701B2

(12) United States Patent
Yadav et al.

(10) Patent No.: US 12,380,701 B2
(45) Date of Patent: Aug. 5, 2025

(54) PREDICTIVE ADJUSTMENT OF MULTI-CAMERA SURVEILLANCE VIDEO DATA CAPTURE

(71) Applicant: Western Digital Technologies, Inc., San Jose, CA (US)

(72) Inventors: Akhilesh Yadav, Bengaluru (IN); Ramanathan Muthiah, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 140 days.

(21) Appl. No.: 18/364,740

(22) Filed: Aug. 3, 2023

(65) Prior Publication Data

US 2025/0046084 A1    Feb. 6, 2025

Related U.S. Application Data

(60) Provisional application No. 63/503,045, filed on May 18, 2023.

(51) Int. Cl.
*G06V 20/52* (2022.01)
*G06V 20/40* (2022.01)
*H04N 5/783* (2006.01)
*H04N 23/90* (2023.01)

(52) U.S. Cl.
CPC .............. *G06V 20/52* (2022.01); *G06V 20/44* (2022.01); *H04N 5/783* (2013.01); *H04N 23/90* (2023.01); *G06V 2201/07* (2022.01)

(58) Field of Classification Search
None
See application file for complete search history.

(56) References Cited

U.S. PATENT DOCUMENTS

| | | | |
|---|---|---|---|
| 7,583,815 B2 | 9/2009 | Zhang | |
| 7,697,827 B2 | 4/2010 | Konicek | |
| 8,824,879 B2 | 9/2014 | Konicek | |
| 9,560,323 B2* | 1/2017 | Huang | G06V 20/52 |
| 10,230,884 B2 | 3/2019 | Okada | |
| 10,643,472 B2* | 5/2020 | Song | G06T 7/292 |
| 10,701,321 B2* | 6/2020 | Westmacott | H04N 7/181 |
| 10,855,921 B2 | 12/2020 | Milne | |
| 10,885,342 B1 | 1/2021 | Day | |
| 10,897,627 B2 | 1/2021 | Muthiah | |
| 11,538,316 B2* | 12/2022 | Lee | G08B 13/19608 |

(Continued)

FOREIGN PATENT DOCUMENTS

| | | |
|---|---|---|
| CN | 109300471 A | 2/2019 |
| JP | 2015104028 A | 6/2015 |

*Primary Examiner* — Ricky Chin
(74) *Attorney, Agent, or Firm* — Patent Law Works LLP

(57) ABSTRACT

Systems, video cameras, and methods for predictive adjustment of multi-camera surveillance video data capture are described. A plurality of networked video camera is deployed with known spatial relationships and non-overlapping fields of view among cameras. When a video event is detected from video data for one of the video cameras, a video capture update message is selectively sent to other video cameras to modify their video capture operations. For example, an object detected by one camera may trigger adjustment of video capture operating parameters for cameras in a direction of travel of the object before it has entered the field of view of those other cameras.

20 Claims, 7 Drawing Sheets

(56) References Cited

U.S. PATENT DOCUMENTS

| | | | |
|---|---|---|---|
| 2004/0257444 A1* | 12/2004 | Maruya | G08B 13/19691 |
| | | | 348/E7.086 |
| 2005/0102133 A1 | 5/2005 | Rees | |
| 2005/0128311 A1 | 6/2005 | Rees | |
| 2007/0236570 A1* | 10/2007 | Sun | G08B 13/19643 |
| | | | 348/169 |
| 2008/0198231 A1* | 8/2008 | Ozdemir | G08B 13/19645 |
| | | | 348/E7.086 |
| 2009/0245573 A1* | 10/2009 | Saptharishi | H04N 23/63 |
| | | | 382/103 |
| 2009/0309973 A1* | 12/2009 | Kogane | H04N 7/185 |
| | | | 348/E7.085 |
| 2010/0141767 A1* | 6/2010 | Mohanty | G08B 13/19643 |
| | | | 348/E5.024 |
| 2010/0157064 A1* | 6/2010 | Cheng | G08B 13/19645 |
| | | | 348/169 |
| 2013/0036628 A1 | 2/2013 | Hussey | |
| 2013/0124207 A1 | 5/2013 | Sarin | |
| 2013/0208113 A1* | 8/2013 | Yoneji | G08B 13/19608 |
| | | | 348/143 |
| 2013/0314543 A1 | 11/2013 | Sutter | |
| 2014/0028826 A1 | 1/2014 | Lee | |
| 2014/0160316 A1 | 6/2014 | Hwang | |
| 2014/0192211 A1 | 7/2014 | Konicek | |
| 2014/0333775 A1* | 11/2014 | Naikal | H04N 21/44008 |
| | | | 348/159 |
| 2015/0172604 A1* | 6/2015 | Kim | G06V 20/40 |
| | | | 348/159 |
| 2016/0189500 A1* | 6/2016 | Kim | G08B 13/19608 |
| | | | 386/223 |
| 2017/0085772 A1 | 3/2017 | Okada | |
| 2017/0127302 A1* | 5/2017 | Fersman | H04W 52/0274 |
| 2017/0221219 A1* | 8/2017 | Cho | H04N 23/661 |
| 2018/0007323 A1 | 1/2018 | Botusescu | |
| 2018/0013658 A1* | 1/2018 | Wiesmaier | H04L 41/12 |
| 2018/0165520 A1 | 6/2018 | Meisser | |
| 2019/0037178 A1 | 1/2019 | Larsen | |
| 2019/0080575 A1* | 3/2019 | Lee | G08B 13/19608 |
| 2019/0104283 A1* | 4/2019 | Wakeyama | G08B 13/19658 |
| 2019/0156849 A1 | 5/2019 | Feng | |
| 2019/0258865 A1 | 8/2019 | Ernesti | |
| 2020/0005615 A1* | 1/2020 | Madden | G06F 18/22 |
| 2020/0105111 A1* | 4/2020 | Messer | G08B 13/19656 |
| 2020/0234057 A1 | 7/2020 | Koo | H04N 5/268 |
| 2020/0327347 A1* | 10/2020 | Arai | H04N 7/181 |
| 2021/0048883 A1 | 2/2021 | Kelly | |
| 2021/0201933 A1 | 7/2021 | Kang | |
| 2021/0289168 A1 | 9/2021 | Glückert | |
| 2021/0342619 A1 | 11/2021 | Faller et al. | |
| 2021/0374971 A1* | 12/2021 | Zhou | G06F 18/22 |
| 2021/0409790 A1* | 12/2021 | Larrew | H04N 21/23103 |
| 2022/0171970 A1* | 6/2022 | Yadav | G06V 20/40 |
| 2022/0215727 A1* | 7/2022 | Jeong | G08B 13/19656 |
| 2022/0292833 A1 | 9/2022 | Ardo | |
| 2022/0383522 A1 | 12/2022 | Lai et al. | |
| 2022/0391090 A1* | 12/2022 | Muthiah | G06N 5/022 |
| 2022/0406065 A1* | 12/2022 | Kang | G06T 7/292 |
| 2023/0031871 A1 | 2/2023 | Shroff | |
| 2023/0064558 A1 | 3/2023 | Griffin et al. | |
| 2023/0082600 A1* | 3/2023 | Nakazato | G08G 1/04 |
| | | | 348/169 |
| 2023/0156337 A1* | 5/2023 | Oh | H04N 23/695 |
| | | | 348/159 |
| 2023/0209204 A1* | 6/2023 | Zu | G06V 40/168 |
| | | | 348/207.99 |
| 2023/0252654 A1* | 8/2023 | Kamiya | G06T 7/246 |
| | | | 382/103 |
| 2024/0007744 A1 | 1/2024 | Muthiah | |
| 2024/0155221 A1* | 5/2024 | Watanabe | H04N 23/90 |
| 2024/0386581 A1 | 11/2024 | Kamada | |

\* cited by examiner

PREDICTIVE ADJUSTMENT OF MULTI-CAMERA SURVEILLANCE VIDEO DATA CAPTURE

TECHNICAL FIELD

The present disclosure generally relates to video surveillance systems and, more particularly, to video surveillance systems configured to control video capture parameters based on other networked video cameras.

BACKGROUND

Network-based video surveillance systems are a growing computing application in both business and personal markets. Some video surveillance systems may include one or more video cameras communicatively connected to a server, such as a network video recorder, through a wired interface, wired or wireless local area network, or wired or wireless wide area network, such as the internet. As video is recorded by the cameras, it is forwarded to the server system where it is stored and/or analyzed for subsequent retrieval. In some configurations, video may be recorded in onboard memory of the cameras, with or without transfer to a server. Client or user systems are communicatively connected to the server system and/or cameras to request, receive, and display streams of recorded video data and/or related alerts and analytics.

An increasing number of video surveillance applications use object detection and recognition, such as facial recognition, based on discrete objects identified in a video stream. Due to the high cost of storage for surveillance applications, including continuous surveillance, video cameras may include features to selectively capture high quality video. For example, once an object, motion, or similar visual condition is detected, the camera may modify its video capture operations to capture high quality data. These modifications of video capture operations may include initiating data capture, such as where a light or motion sensor provides the visual condition, changing the video capture rate from a lower video capture rate to a higher video capture rate, moving the field of view of the camera using zoom and/or pan-tilt-zoom (PTZ) capabilities, and/or changing data storage destinations.

While such trigger conditions reduce video data usage, they may also delay object detection, miss fast moving objects, miss data objects that are more difficult to detect at lower capture rates, miss objects within PTZ range that do not cross a current field of view, and/or miss early portions of a video event of interest (which may include critical angles, lighting, or other image features to support object recognition).

Systems and methods for predictively modifying video capture operations for selective capture of objects of interest based on data from another networked video camera in the neighborhood may be advantageous. A reliable and efficient way of using video data from a networked video camera in the same vicinity to initiate modification of video capture operations before an object is detectable in the field of view of the video camera may be needed.

SUMMARY

Various aspects for predictively modifying video capture operations in a multi-camera video surveillance network, particularly using video data from a first camera to initiate changes in video capture parameters of another camera with non-overlapping fields of view, are described.

One general aspect includes a system that includes a first video camera having a first field of view, where a plurality of networked video cameras includes the first video camera, and a controller in communication with the plurality of networked video cameras and configured to: receive video data from the first video camera; determine, from the video data, a first video event; determine, based on the first video event, at least one other video camera from the plurality of networked video cameras, where the at least one other video camera does not have an overlapping field of view with the first video camera; and send, to the at least one other video camera and based on the first video event, a video capture update message, where the at least one other video camera is configured to, responsive to the video capture update message, modify a video capture operation of the at least one other video camera and capture, using the at least one other video camera, video data based on the modified video capture operation.

Implementations may include one or more of the following features. The at least one other video camera may be configured for a plurality of video capture rates, and modifying the video capture operation may include: operating, during a first operating period, at a first video capture rate from the plurality of video capture rates; and selecting, responsive to the video capture update message and during a second operating period, a second video capture rate to modify the video capture operation. The at least one other video camera may include an actuator configured to adjust a direction of a field of view of the at least one other video camera, and modifying the video capture operation may include: operating, during a first operating period, in a first position of a plurality of positions for adjusting the direction of the field of view; and selecting, responsive to the video capture update message and during a second operating period, a second position of the plurality of positions. The at least one other video camera may include a plurality of storage modes for storing video data to a non-volatile storage medium, and modifying the video capture operation may include: operating, during a first operating period, in a first storage mode of the plurality of storage modes; and selecting, responsive to the video capture update message and during a second operating period, a second storage mode of the plurality of storage modes. The at least one other video camera may include a plurality of sets of video capture operating parameters, the at least one other video camera may be further configured to use a first set of video capture operating parameters during a first operating period, and modifying the video capture operation may include: determining a duration for a second operating period for determining, from video data of the at least one other video camera, a second video event related to the first video event; and selecting, responsive to the video capture update message and during the second operating period, a second set of video capture operating parameters. Determining the first video event may include detecting, using an object detection model, an object of interest in the video data. Determining the at least one other video camera from the plurality of networked video cameras may include: determining a set of object parameters for the object of interest; and using the set of object parameters to select the at least one other video camera from the plurality of networked video cameras. Modifying the video capture operation of the at least one other video camera occurs prior to the object of interest entering a field of view of the at least one other video camera. The video capture update message may include the set of object parameters for the object of interest, and modifying the video capture operation may include modifying, based on the set of object parameters, a set of video capture operating parameters to increase a likelihood of detecting the object of interest. The system may include a data structure configured to: identify the plurality of networked video cameras; identify spatial relationships among the plurality of networked video cameras; identify a plurality of sets of video capture operating parameters for each video camera of the plurality of networked video cameras; and use an index value based on video event parameters, where the controller is further configured to use the data structure to determine, based on video event parameters for the first video event, the at least one other video camera and contents of the video capture update message. The video event parameters for the first video event may include an object type parameter and a direction of motion parameter, and the direction of motion parameter may be used to determine, based on the data structure: the at least one other video camera; and a set of video capture operating parameters from the plurality of sets of video capture operating parameters for the at least one other video camera. The video capture update message may include at least one frame from video data corresponding to the first video event, the at least one other video camera may be further configured to process video data from the modified video capture operation through an object recognition model, and the object recognition model may use the at least one frame received in the video capture update message as object recognition reference data.

Another general aspect includes a computer-implemented method that includes: receiving video data from a first video camera of a plurality of networked video cameras; determining, from the video data, a first video event; determining, based on the first video event, at least one other video camera from the plurality of networked video cameras, where the at least one other video camera does not have an overlapping field of view with the first video camera; sending, to the at least one other video camera and based on the first video event, a video capture update message; and responsive to the video capture update message: modifying a video capture operation of the at least one other video camera; and capturing, using the at least one other video camera, video data based on the modified video capture operation.

Implementations may include one or more of the following features. The at least one other video camera may be configured for a plurality of video capture rates and modifying the video capture operation may include: operating, during a first operating period, at a first video capture rate from the plurality of video capture rates; and selecting, responsive to the video capture update message and during a second operating period, a second video capture rate to modify the video capture operation. The at least one other video camera may include an actuator configured to adjust a direction of a field of view of the at least one other video camera, and modifying the video capture operation may include: operating, during a first operating period, in a first position of a plurality of positions for adjusting the direction of the field of view; and selecting, responsive to the video capture update message and during a second operating period, a second position of the plurality of positions. The at least one other video camera may include a plurality of storage modes for storing video data to a non-volatile storage medium, and modifying the video capture operation may include: operating, during a first operating period, in a first storage mode of the plurality of storage modes; and selecting, responsive to the video capture update message and during a second operating period, a second storage mode of the plurality of storage modes. The at least on other video camera may include a plurality of sets of video capture operating parameters, the at least one other video camera may be further configured to use a first set of video capture operating parameters during a first operating period, and modifying the video capture operation may include: determining a duration for a second operating period for determining, from video data of the at least one other video camera, a second video event related to the first video event; and selecting, responsive to the video capture update message and during the second operating period, a second set of video capture operating parameters. Determining the first video event may include detecting, using an object detection mode, an object of interest in the video data; determining the at least one other video camera from the plurality of networked video cameras may include determining a set of object parameters for the object of interest and using the set of object parameters to select the at least one other video camera from the plurality of networked video cameras; and modifying the video capture operation of the at least one other video camera may occur prior to the object of interest entering a field of view of the at least one other video camera. The video capture update message may include the set of object parameters for the object of interest, and modifying the video capture operation may include modifying, based on the set of object parameters, a set of video capture operating parameters to increase a likelihood of detecting the object of interest. The computer-implemented method may include: indexing, using video event parameters, a data structure configured to identify the plurality of networked video cameras, identify spatial relationships among the plurality of networked video cameras; and identify a plurality of sets of video capture operating parameters for each video camera of the plurality of networked video cameras; and using the data structure to determine, based on video event parameters for the first video event, the at least one other video camera and contents of the video capture update message. The computer-implemented method may include processing video data from the modified video capture operation through an object recognition model, where the video capture update message may include at least one frame from video data corresponding to the first video event, and the object recognition model uses the at least one frame received in the video capture update message as object recognition reference data.

Still another general aspect includes a system that includes: a plurality of networked video cameras; a processor; a memory; means for receiving video data from a first video camera of the plurality of networked video cameras; means for determining, from the video data, a first video event; means for determining, based on the first video event, at least one other video camera from the plurality of networked video cameras, where the at least one other video camera does not have an overlapping field of view with the first video camera; means for sending, to the at least one other video camera and based on the first video event, a video capture update message; means for modifying, responsive to the video capture update message, a video capture operation of the at least one other video camera; and means for capturing, using the at least one other video camera, video data based on the modified video capture operation.

The various embodiments advantageously apply the teachings of computer-based surveillance systems to improve the functionality of such computer systems. The various embodiments include operations to overcome or at least reduce the issues previously encountered in surveillance systems and, accordingly, are more effective and/or cost-efficient than other surveillance systems. That is, the various embodiments disclosed herein include hardware and/or software with functionality to improve selective capture of surveillance video data by using video data from other cameras in a vicinity to trigger modifications of video capture operations. Accordingly, the embodiments disclosed herein provide various improvements to network-based video surveillance systems.

It should be understood that language used in the present disclosure has been principally selected for readability and instructional purposes, and not to limit the scope of the subject matter disclosed herein.

DETAILED DESCRIPTION

Figure 1:
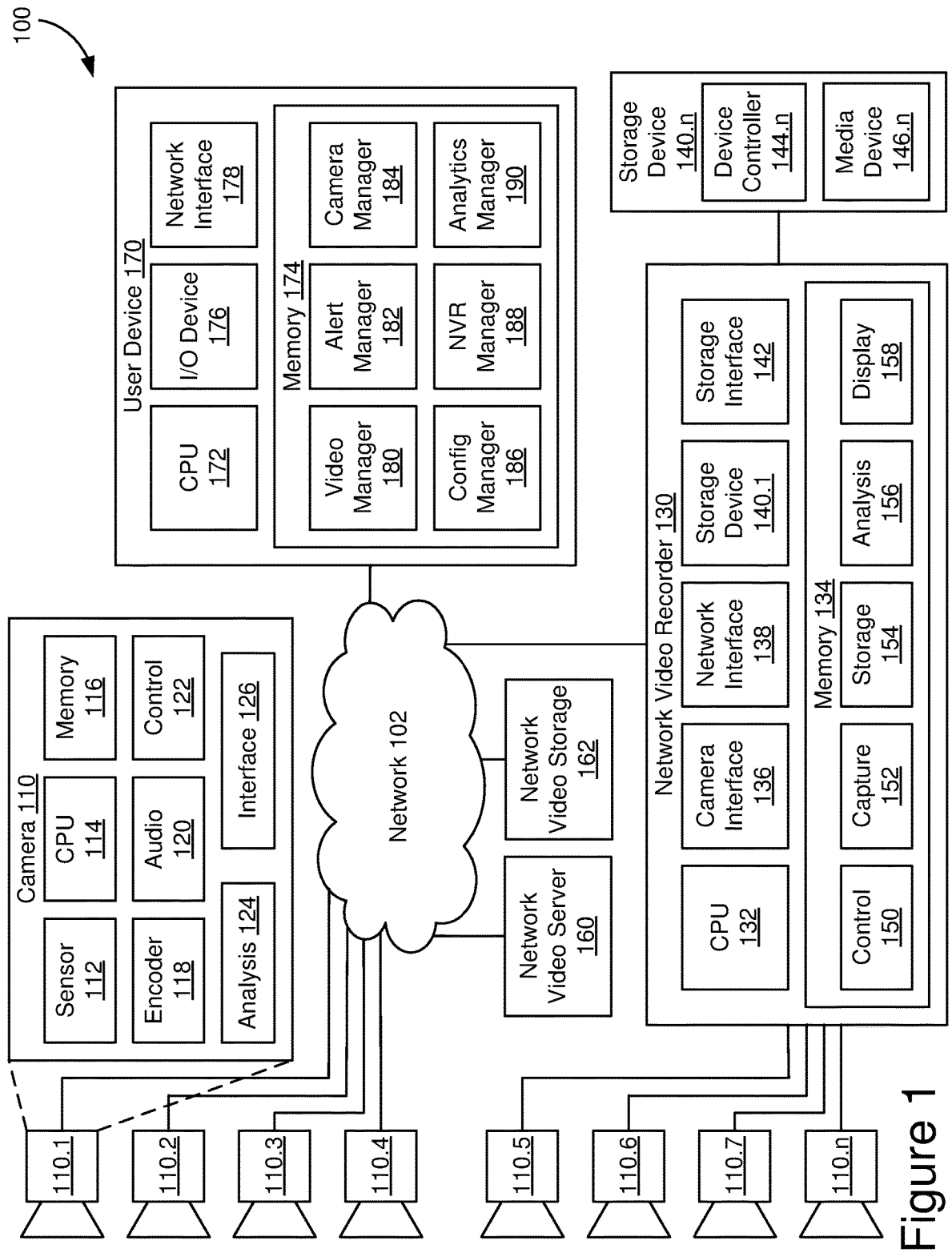
FIG. 1 schematically illustrates a computer-based surveillance system.

FIG. 1 shows an embodiment of an example video surveillance system 100 with multiple video cameras 110 interconnected to a network video recorder 130 for display of surveillance video on user device 170. While some example features are illustrated, various other features have not been illustrated for the sake of brevity and so as not to obscure pertinent aspects of the example embodiments disclosed herein. In some embodiments, cameras 110, network video recorder 130, and user device 170 are computer-based components that may be interconnected by a network 102. Additional components, such as network video server 160 and/or network video storage 162 may also be connected to network 102. In some embodiments, one or more cameras may connect directly to network video recorder 130, such as cameras 110.5-110.n in FIG. 1, without communicating through network 102. Similarly, in alternate embodiments (not shown), user device 170 may connect directly to network video recorder 130.

In some embodiments, one or more networks 102 may be used to communicatively interconnect various components of surveillance system 100. For example, each component, such as cameras 110, network video recorder 130, external storage device 140.n, network video server 160, network video storage 162, and/or user device 170 may include one or more network interfaces and corresponding network protocols for communication over network 102. Network 102 may include a wired and/or wireless network (e.g., public and/or private computer networks in any number and/or configuration) which may be coupled in a suitable way for transferring data. For example, network 102 may include any means of a conventional data communication network such as a local area network (LAN), a wide area network (WAN), a telephone network, such as the public switched telephone network (PSTN), an intranet, the internet, or any other suitable communication network or combination of communication networks. In some embodiments, network 102 may comprise a plurality of distinct networks, subnetworks, and/or virtual private networks (VPN) may be used to limit communications among specific components. For example, cameras 110 may be on a limited access network such that video and control data may only be transmitted between cameras 110 and network video recorder 130, enabling network video recorder 130 to control access to cameras 110 and their video data.

Cameras 110 may include analog or digital cameras connected to an encoder that generates an encoded video stream with a defined resolution, aspect ratio, and video encoding format. In some embodiments, cameras 110 may include internet protocol (IP) cameras configured to encode their respective video streams and stream them over network 102 to network video recorder 130. In some embodiments (not shown), the encoder may reside in network video recorder 130. In some embodiments, cameras 110 may be configured to receive audio data through integrated or connected microphones (not shown) and include embedded, synchronized, and/or independent audio streams with their respective video streams. In some embodiments, video cameras 110 may include an image sensor 112, a processor or central processing unit CPU 114, a memory 116, an encoder 118, an audio channel 120, a control circuit 122, and/or a network interface 126. In some embodiments, video cameras 110 may include onboard analytics, such as a video analysis subsystem 124.

For example, image sensor 112 may include a solid state device configured to capture light waves and/or other electromagnetic waves and convert the light into an image, generally composed of colored pixels. Image sensor 112 may determine a base image size, resolution, bandwidth, depth of field, dynamic range, and other parameters of the video image frames captured. Image sensor 112 may include charged couple device (CCD), complementary metal oxide semiconductor (CMOS), and/or other image sensor devices of various sensor sizes and aspect ratios. In some embodiments, image sensor 112 may be paired with one or more filters, such as infrared (IR) blocking filters, for modifying the light received by image sensor 112 and/or processed by camera 110. For example, an IR blocking filter may be selectively enabled or disabled for different image capture use cases. In some embodiments, one or more video cameras 110 may include more than one image sensor and related video data paths. In some embodiments, multiple image sensors are supported by the same circuit board and/or processing subsystem containing CPU 114, memory 116, encoder 118, audio channel 120, control circuit 122, analysis subsystem 124, and/or network interface 126.

Digital video data from image sensor 112 may be received by processor 114 for (temporary) storage and processing in memory 116 and/or encoding by encoder 118. Processor 114 may include any type of conventional processor or microprocessor that interprets and executes instructions. In some embodiments, processor 114 may include a neural network processor, such as a neural network processor used by analysis subsystem 124 for supporting object recognition or other onboard analysis. Memory 116 may include a random access memory (RAM) or another type of dynamic storage device that stores information and instructions for execution by processor 114 and/or a read only memory (ROM) or another type of static storage device that stores static information and instructions for use by processor 114 and/or any suitable storage element such as a solid state storage element. Memory 116 may store basic input/output system (BIOS), firmware, and/or operating system instructions for initializing and executing the instructions and processes of cameras 110. Encoder 118 may use various possible digital encoding and/or compression formats for encoding the video stream received by image sensor 112. In some embodiments, encoder 118 may use a compressed video format to reduce the storage size and network bandwidth necessary for storing and transferring the original video stream. For example, encoder 118 may be configured to encode the video data as joint photographic expert group (JPEG), motion picture expert group (MPEG)-2, MPEG-4, advanced video coding (AVC)/H.264, and/or other video encoding standards or proprietary formats. In some configurations, the settings used by encoder 118 may be modified responsive to a video capture update message received by camera 110.

Camera 110 may include audio channel 120 configured to capture audio data to be processed and encoded with image data in the resulting video stream and/or as an independent audio data stream. In some embodiments, one or more microphones may be enabled to capture audio data in parallel with the image data captured by image sensor 112 and/or may operate to capture audio data even when image sensor 112 is not actively capturing video data. For example, one or more microphones may be configured with an audio sensor that captures sound waves and converts them into a time-based audio data stream for an audio field in the vicinity of the video camera. In some embodiments, encoder 118 may include an audio encoder that operates in conjunction with the video encoder to encode a synchronized audio data stream in the video stream. For example, the video format used by encoder 118 may include one or more audio tracks for encoding audio data to accompany the image data during video stream playback. In some embodiments, encoder 118 may include a separate audio encoder for independently encoding an audio data stream that may be provided through audio channel 120 for data analysis independent of the video data.

Control circuit 122 may include a control circuit for managing the physical position of a camera 110. In some embodiments, camera 110 may be a pan-tilt-zoom (PTZ) camera that is capable of remote directional and zoom control. Control circuit 122 may be configured to receive motion commands through network interface 126 and/or through another interface, such as a dedicated remote-control interface, such short distance infrared signals, Bluetooth, etc. For example, network video recorder 130 and/or user device 170 may be configured to send PTZ commands to control circuit 122, which translates those commands into motor position control signals for a plurality of actuators that control the position of camera 110. In some embodiments, control circuit 122 may include logic for automatically responding to movement or other triggers detected through image sensor 112 to redirect camera 110 toward the source of movement or other trigger. For example, an auto tracking feature may be embodied in firmware that enables the camera to estimate the size and position of an object based on changes in the pixels in the raw video stream from image sensor 112 and adjust the position of the camera to follow the moving object, returning to a default position when movement is no longer detected. Similarly, an auto capture feature may be embodied in firmware that enables the camera to determine and bound an object based on an object detection algorithm and center and zoom on that object to improve image size and quality. In some embodiments, control circuit 122 may include logic for virtual PTZ or ePTZ, which enables a high-resolution camera to digitally zoom and pan to portions of the image collected by image sensor 112, with no physical movement of the camera. In some embodiments, control circuit 122 may include software and one or more application protocol interfaces (APIs) for enabling remote devices to control additional features and capabilities of camera 110. For example, control circuit 122 may enable network video recorder 130, another video camera 110, and/or user device 170 to configure video formats, enable and disable filters, set motion and/or audio detection, auto tracking, and similar features, and/or initiate video data streaming. In some embodiments, one or more systems may provide PTZ position control signals (and/or PTZ positioning commands converted to PTZ position control signals by control circuit 122) through the API. In some configurations, control circuit 122 may modify camera position or other features in response to a video capture update message received by camera 110.

In some embodiments, video camera 110 may include video analysis subsystem 124 configured for onboard video analytics. For example, video analysis subsystem 124 may be configured to use CPU 114 and memory 116 to execute at least a portion of video analytics for video data captured by video camera 110. In some embodiments, video analysis subsystem 124 may be configured to operate similarly to video analysis subsystem 156 in network video recorder 130, as further described below, and embody one or more analytics engines and/or analytical model libraries. In some embodiments, video analysis subsystem 124 may be configured to support object detection, classification, and/or recognition. For example, video analysis subsystem 124 may receive the real-time video data stream from sensor 112 and/or encoder 118, detect a video event, and instruct another camera to modify video capture operations prior to an object of interest entering the field of view of that other camera. In some configurations, the settings and reference data used by video analysis subsystem 124 may be modified responsive to a video capture update message received by camera 110.

Network interface 126 may include one or more wired or wireless connections to network 102 and/or a dedicated camera interface of network video recorder 130. For example, network interface 126 may include an ethernet jack and corresponding protocols for IP communication with network video recorder 130. In some embodiments, network interface 126 may include a power over ethernet (POE) connection with network video recorder 130 or another camera access point. PoE may enable both power for camera 110 and network data to travel on the same wire. In some embodiments, network interface 126 may enable an IP camera to be configured as a network resource with an IP address that is accessible on a LAN, WAN, or the internet. For example, network video recorder 130 and/or user device 170 may be configured to selectively receive video from cameras 110 from any internet-connected location using internet addressing and security protocols.

Network video recorder 130 may include a computer system configured as a video storage device to record the video streams from cameras 110. For example, network video recorder 130 may be configured to receive video streams from each of cameras 110 for storage, analysis, and/or display through user device 170. In some embodiments, cameras 110 may send encoded video streams based on the raw image data collected from their respective image sensors 112, with or without video data compression. A single video stream may be received from each camera 110 and network video recorder 130 may be configured to receive video streams from all connected cameras in parallel, as network bandwidth and processing resources allow.

Network video recorder 130 may include a housing and a bus interconnecting at least one processor or CPU 132, at least one memory 134, at least one storage device 140, and at least one interface, such as camera interface 136, network interface 138, and/or storage interface 142. The housing (not shown) may include an enclosure for mounting the various subcomponents of network video recorder 130, locating any physical connectors for the interfaces, and protecting the subcomponents. Some housings may be configured for mounting within a rack system. The bus (not shown) may include one or more conductors that permit communication among the components of network video recorder 130. Processor 132 may include any type of processor or microprocessor that interprets and executes instructions or operations. Memory 134 may include a random access memory (RAM) or another type of dynamic storage device that stores information and instructions for execution by processor 132 and/or a read only memory (ROM) or another type of static storage device that stores static information and instructions for use by processor 132 and/or any suitable storage element.

In some embodiments, network video recorder 130 may include camera interface 136 configured for connection with one or more cameras 110. For example, camera interface 136 may include a plurality of ethernet ports and supporting protocols compatible with PoE standards for connecting to cameras 110.5-110.n. In some embodiments, camera interface 136 may include a PoE network switch for providing power to connected cameras and routing data packets to and from cameras 110.5-110.n, such as control and video data. In some embodiments, network video recorder 130 may not include a dedicated camera interface 136 and may use network interface 138 for communication with cameras 110 over network 102.

Network interface 138 may include one or more wired or wireless network connections to network 102. Network interface 138 may include a physical interface, such as an ethernet port, and related hardware and software protocols for communication over network 102, such as a network interface card.

Storage devices 140 may include one or more non-volatile memory devices configured to store video data, such as a hard disk drive (HDD) or solid state drive (SSD). In some embodiments, storage device 140 is, or includes, a plurality of solid-state drives. In some embodiments, network video recorder 130 may include internal storage device 140.1 and expandable storage that enables additional storage devices 140.n to be connected via storage interface 142. Each storage device 140 may include a non-volatile memory (NVM) or device controller 144 based on compute resources (processor and memory) and a plurality of NVM or media devices 146 for data storage (e.g., one or more NVM device(s), such as one or more flash memory devices). In some embodiments, a respective data storage device 140 of the one or more data storage devices includes one or more NVM controllers, such as flash controllers or channel controllers (e.g., for storage devices having NVM devices in multiple memory channels). In some embodiments, storage devices 140 may each be packaged in a housing, such as a multi-part sealed housing with a defined form factor and ports and/or connectors for interconnecting with storage interface 142. Storage device 140.1 and each expanded storage devices 140.n may be of the same storage device type or a different storage device type.

In some embodiments, a respective data storage device 140 may include a single non-volatile storage medium device, while in other embodiments the respective data storage device 140 includes a plurality of media devices. In some embodiments, media devices include NAND-type flash memory or NOR-type flash memory. In some embodiments, storage device 140 may include one or more hard disk drives. In some embodiments, storage devices 140 may include a flash memory device, which in turn includes one or more flash memory die, one or more flash memory packages, one or more flash memory channels or the like. However, in some embodiments, one or more of the data storage devices 140 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, each storage device 140 includes a device controller 144, which includes one or more processing units (also sometimes called CPUs or processors or microprocessors or microcontrollers) configured to execute instructions in one or more programs. In some embodiments, the one or more processors are shared by one or more components within, and in some cases, beyond the function of the device controllers. Media devices 146 are coupled to device controllers 144 through connections that typically convey commands in addition to data, and optionally convey metadata, error correction information and/or other information in addition to data values to be stored in media devices and data values read from media devices 146. Media devices 146 may include any number (i.e., one or more) of memory devices including, without limitation, non-volatile semiconductor memory devices, such as flash memory device(s). In some embodiments, media devices 146 may include NAND or NOR flash memory devices comprised of single level cells (SLC), multiple level cell (MLC), triple-level cells, or more.

In some embodiments, media devices 146 in storage devices 140 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 140 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on storage devices 140, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, video media files, or other logical data constructs composed of multiple host blocks. In some embodiments, storage device 140 may be configured specifically for managing the storage and overwriting of video data in a continual monitoring application for video surveillance.

Storage interface 142 may include a physical interface for connecting to one or more external storage devices using an interface protocol that supports storage device access. For example, storage interface 142 may include a peripheral component interconnect express (PCIe), serial advanced technology attachment (SATA), small computer system interface (SCSI), serial attached SCSI (SAS), universal serial bus (USB), Firewire, or similar storage interface connector supporting storage protocol access to storage devices 140.n. In some embodiments, storage interface 142 may include a wireless data connection with sufficient bandwidth for video data transfer. Depending on the configuration and protocols used by storage interface 142, storage device 140.n may include a corresponding interface adapter, firmware, and/or protocols for receiving, managing, and responding to storage commands from network video recorder 130.

Network video recorder 130 may include a plurality of modules or subsystems that are stored and/or instantiated in memory 134 for execution by processor 132 as instructions or operations. For example, memory 134 may include a camera control subsystem 150 configured to control cameras 110. Memory 134 may include a video capture subsystem 152 configured to receive video streams from cameras 110. Memory 134 may include a video storage subsystem 154 configured to store received video data in storage device(s) 140 and/or network video storage 162. Memory 134 may include a video analysis subsystem configured to analyze video streams and/or video data for defined events, such as motion, recognized objects, recognized faces, and combinations thereof. Memory 134 may include a video display subsystem configured to selectively display video streams on user device 170, which may be attached to network video recorder 130 or remotely connected via network 102.

In some embodiments, camera control subsystem 150 may include interface protocols and a set of functions and parameters for using, configuring, communicating with, and providing command messages to cameras 110. For example, camera control subsystem 150 may include an API and command set for interacting with control circuit 122 to access one or more camera functions. In some embodiments, camera control subsystem 150 may be configured to set video configuration parameters for image sensor 112 and/or video encoder 118, access pan-tilt-zoom features of control circuit 122, set or modify camera-based motion detection, tripwire, and/or low light detection parameters in memory 116, and/or otherwise manage operation of cameras 110. For example, camera control subsystem 150 may maintain a video camera configuration table, pages, or similar data structures that includes entries for each video camera being managed and their respective camera-specific configuration parameters, active control features (such as PTZ control), and other configuration and control information for managing cameras 110. In some embodiments, each camera 110 may be assigned a unique camera identifier that may be used by camera control subsystem 150, video capture subsystem 152, and/or other subsystems to associate video data with the camera from which it was received. In some configurations, network video recorder 130 may be configured to respond to video events detected from the video stream for one camera by sending camera control messages, such as a video capture update message, to modify the video capture of other cameras through camera control subsystem 150. For example, camera control subsystem 150 may include multiple camera-specific sets of configuration parameters for video capture operations and a neighborhood table for determining how each other camera should respond to video events detected from another camera.

In some embodiments, video capture subsystem 152 may include interface protocols and a set of functions and parameters for receiving video streams from cameras 110. For example, video capture subsystem 152 may include video data channels and related data buffers for managing a plurality of camera video data streams. In some embodiments, each video camera 110 may be allocated a dedicated video channel for continuously and/or selectively sending its video stream to network video recorder 130. Video capture subsystem 152 may be configured to pass each received video stream to video storage subsystem 154, video analysis subsystem 156, and/or video display subsystem 158. For example, received video streams may be buffered by video capture subsystem 152 before being streamed to video storage subsystem 154 and split into dual video streams with different video parameters for video analysis subsystem 156 and video display subsystem 158.

In some embodiments, video storage subsystem 154 may include interface protocols and a set of functions and parameters for managing storage of video data in storage devices 140 and/or network video storage 162 for later retrieval and use by video analysis subsystem 156 and/or video display subsystem 158. For example, video storage subsystem 154 may write camera video stream data from video data buffers to non-volatile storage in storage devices 140 and video analysis subsystem 156 and/or video display subsystem 158 may be configured to selectively read video data from storage devices 140. In some embodiments, video storage subsystem 154 may include management of video storage space in storage devices 140 and/or network video storage 162 in accordance with one or more data retention and/or data archiving schemes. For example, surveillance system 100 may support continuous and/or triggered recording of video data from cameras 110 and video storage subsystem 154 may include logic for enforcing a data retention and overwriting policy whereby the fixed storage space of storage devices 140 is recycled for storing a recent period of captured video, video data meeting specific retention criteria, and/or deleting or archiving video data after one or more periods of time defined in the data retention policy. In some embodiments, video storage subsystem 154 may include or access video decoders and/or encoders for storing video data in a storage video format that is different than the camera video format, such as using a different codec, compression factor, frame rate, resolution, image size, etc. In some embodiments, video storage subsystem may store embedded audio data with the video data and/or may store audio data in separate audio data files or objects.

In some embodiments, video analysis subsystem 156 may include interface protocols and a set of functions and parameters for analyzing video data from cameras 110. For example, video analysis subsystem 156 may be configured to run one or more event detection algorithms for determining, tagging, and/or initiating alerts or other actions in response to detected video events and/or audio events. In some embodiments, video analysis subsystem 156 may be configured to tag or build metadata structures that map detected events to time and image location markers for the video stream from which they are detected. For example, video analysis subsystem 156 may use motion, tripwire, object recognition, facial recognition, audio detection, speech recognition, and/or other algorithms to determine events occurring in a video stream and tag them in a corresponding metadata track and/or separate metadata table associated with the video data object. In some embodiments, video analysis subsystem 156 may include event handling logic for determining response to detection of one or more detected events, such as raising an alert to user device 170 or triggering selective display of a video stream including the detected event through video display subsystem 158. In some embodiments, video analysis subsystem 156 may operate in real-time or near real-time on video data received by video capture subsystem 152, delayed processing of video data stored by video storage subsystem 154, and/or a combination thereof based on the nature (and processing requirements) of the video events, volume of video to be processed, and other factors. In some embodiments, video analysis subsystem 156 may comprise one or more analytics engines configured for a particular type of event and corresponding event detection algorithm or model.

In some embodiments, video display subsystem 158 may include interface protocols and a set of functions and parameters for displaying video from video capture subsystem 152 and/or video storage subsystem 154 on user device 170. For example, video display subsystem 158 may include a monitoring or display configuration for displaying one or more video streams in real-time or near real-time on a graphical user display of user device 170 and/or receive video navigation commands from user device 170 to selectively display stored video data from video storage subsystem 154. In some embodiments, video display subsystem 158 may maintain an index of real-time/near real-time video streams and/or stored or archived video streams that are available for access by user device 170. In some embodiments, the video index may include a corresponding metadata index that includes video data parameters (e.g., time, location, camera identifier, format, low light/normal light, etc.), detected video event metadata (event time, location, type, parameters, etc.), and/or video management parameters (expiration, active/archive, access control, etc.) for use in displaying and managing video data. Video display subsystem 158 may be configured to support user device 170 when directly attached to network video recorder 130 and/or via network 102 within a LAN, WAN, VPN, or the internet.

In some embodiments, surveillance system 100 may include one or more remote and/or cloud-based resources for supporting the functions of network video recorder 130 and/or user device 170. For example, surveillance system 100 may include a network video server 160 configured to host some, all, or select portions of the functions of network video recorder 130, such as a cloud-based server system. As another example, surveillance system 100 may include network video storage 162 for storing active and/or archived video data, supplementing and/or replacing storage devices 140, such as a cloud-based network attached storage system or distributed storage system. In some embodiments, the majority of functions described above for network video recorder 130 may reside in network video recorder 130 and select functions may be configured to leverage additional resources in network video server 160 and/or network video storage 162. For example, network video server 160 may be configured to support specialized and/or processing intensive event detection algorithms to supplement video analysis subsystem 156 and/or network video storage 162 may be configured to support archiving of inactive video data for longer term storage.

User device 170 may be any suitable computer device, such as a computer, a computer server, a laptop computer, a tablet device, a netbook, an internet kiosk, a personal digital assistant, a mobile phone, a smart phone, a gaming device, or any other computing device. User device 170 is sometimes called a host, client, or client system. In some embodiments, user device 170 may host or instantiate one or more applications for interfacing with surveillance system 100. For example, user device 170 may be a personal computer or mobile device running a surveillance monitoring and management application configured to provide a user interface for network video recorder 130. In some embodiments, user device 170 may be configured to access cameras 110 and/or their respective video streams through network video recorder 130 and/or directly through network 102. In some embodiments, one or more functions of network video recorder 130 may be instantiated in user device 170 and/or one or more functions of user device 170 may be instantiated in network video recorder 130.

User device 170 may include one or more processors or CPUs 172 for executing compute operations or instructions stored in memory 174 for accessing video data and other functions of network video recorder 130 through network 102. In some embodiments, processor 172 may be associated with memory 174 and input/output device 176 for executing both video display operations and surveillance system management operations. Processor 172 may include any type of processor or microprocessor that interprets and executes instructions or operations. Memory 174 may include a random access memory (RAM) or another type of dynamic storage device that stores information and instructions for execution by processor 172 and/or a read only memory (ROM) or another type of static storage device that stores static information and instructions for use by processor 172 and/or any suitable storage element. In some embodiments, user device 170 may allocate a portion of memory 174 and/or another local storage device (in or attached to user device 170) for storing selected video data for user device 170. In some embodiments, user device 170 may include one or more input/output (I/O) devices 176. For example, a graphical display, such as a monitor and/or touch screen display, and/or other user interface components such as a keyboard, a mouse, function buttons, speakers, vibration motor, a track-pad, a pen, voice recognition, biometric mechanisms, and/or any number of supplemental devices to add functionality to user device 170. Network interface 178 may include one or more wired or wireless network connections to network 102. Network interface 178 may include a physical interface, such as an ethernet port, and/or related hardware and software protocols for communication over network 102, such as a network interface card, wireless network adapter, and/or cellular data interface.

User device 170 may include a plurality of modules or subsystems that are stored and/or instantiated in memory 174 for execution by processor 172 as instructions or operations. For example, memory 174 may include a video manager 180 configured to provide a user interface for selectively navigating and displaying real-time, near real-time, and/or stored video streams. Memory 174 may include alert manager 182 configured to provide a user interface for setting, monitoring, and displaying alerts based on video events. Memory 174 may include a camera manager 184 configured to provide a user interface for identifying, configuring, and managing cameras 110. Memory 174 may include a configuration manager 186 to provide a user interface for setting and managing system settings, user access controls, storage options, and other configuration settings for surveillance system 100. Memory 174 may include a network video recorder manager 188 configured to provide a user interface for identifying, configuring, and managing network video recorder 130 and/or multiple network video recorders. Memory 174 may include an analytics manager configured to provide a user interface for selecting, training, and managing event detection algorithms for surveillance system 100.

In some embodiments, video manager 180 may include interface protocols and a set of functions and parameters for navigating and displaying video streams from cameras 110. For example, video manager 180 may include a graphical user interface and interactive controls for displaying lists, tables, thumbnails, or similar interface elements for selecting and displaying video streams for particular cameras, times, locations, and/or events. In some embodiments, video manager 180 may enable split screen display of multiple camera video streams. For example, the near real-time video streams (with a predetermined lag based on network lag, storage, and processing times) from all active cameras may be displayed on a monitoring interface or a set of video streams corresponding to a detected event may be displayed in an event review interface. In some embodiments, video manager 180 may include a data structure summarizing all video data stored in surveillance system 100 to enable the user to locate and view older surveillance video data. For example, a video management log or database may include entries for stored video data indexed by related metadata, such as video data parameters (e.g., time, location, camera identifier, format, low light/normal light, etc.), detected video event metadata (event time, location, type, parameters, etc.), and/or video management parameters (expiration, active/archive, access control, etc.). In some embodiments, video manager 180 may be configured to interface with video display subsystem 158 and/or storage subsystem 154 for determining and retrieving selected video data.

In some embodiments, alert manager 182 may include interface protocols and a set of functions and parameters for setting, monitoring, and displaying alerts based on video events. For example, the user may define a set of trigger events that generate visual, audible, tactile, and/or notification-based (electronic mail, text message, automated call, etc.) alert to user device 170. In some embodiments, alert manager 182 may include a plurality of preset alert conditions with associated event parameters and allow a user to enable and disable alert types and/or change associated event parameters. In some embodiments, alert manager 182 may be configured to overlay graphical elements representing detected events or event indicators on video streams displayed through video manager 180. For example, detected motion, objects, or faces may be boxed or highlighted, tagged with relevant identifiers, or otherwise indicated in the video playback on user device 170. In some embodiments, alert manager 182 may be configured to interface with video analysis subsystem 156, video capture subsystem 152, and/or directly with cameras 110 for receiving event notifications or parameters.

In some embodiments, camera manager 184 may include interface protocols and a set of functions and parameters for identifying, configuring, and managing cameras 110. Configuration manager 186 may include interface protocols and a set of functions and parameters for setting and managing system settings, user access controls, storage options, and other configuration settings. Network video recorder (NVR) manager 188 may include interface protocols and a set of functions and parameters for identifying, configuring, and managing network video recorder 130. For example, each of camera manager 184, configuration manager 186, and/or NVR manager 188 may include a series of graphical user interfaces for displaying their respective component identifiers and related configuration parameters and enabling the user to view and/or change those parameters for managing surveillance system 100 and its component systems. In some embodiments, camera manager 184, configuration manager 186, and/or NVR manager 188 may provide changes parameters to the effected components, such as camera manager 184 sending camera configuration parameter changes to selected cameras 110, NVR manager 188 sending NVR configuration parameter changes to network video recorder 130, and/or configuration manager 186 sending system configuration parameter changes to all effected components.

In some embodiments, analytics manager 190 may include interface protocols and a set of functions and parameters for selecting, training, and managing event detection algorithms. For example, analytics manager 190 may include a library of event detection algorithms for different event types. In some embodiments, the event detection algorithms may include a set of parameters and/or model weights that are preconfigured based on training data sets processed independent of surveillance system 100. For example, analytics manager 190 may include object detection algorithms for common objects, situations, and camera configurations. In some embodiments, analytics manager 190 may include preconfigured training data sets and/or allow the user to define training data sets for determining or refining event detection algorithm parameters and/or model weights based on predefined base algorithms or models. In some embodiments, analytics manager 190 may interface with analysis subsystem 156 for using the event detection algorithms configured through analytics manager 190 to process video data received by network video recorder 130 and/or selecting, training, and managing those algorithms.

Figure 2:
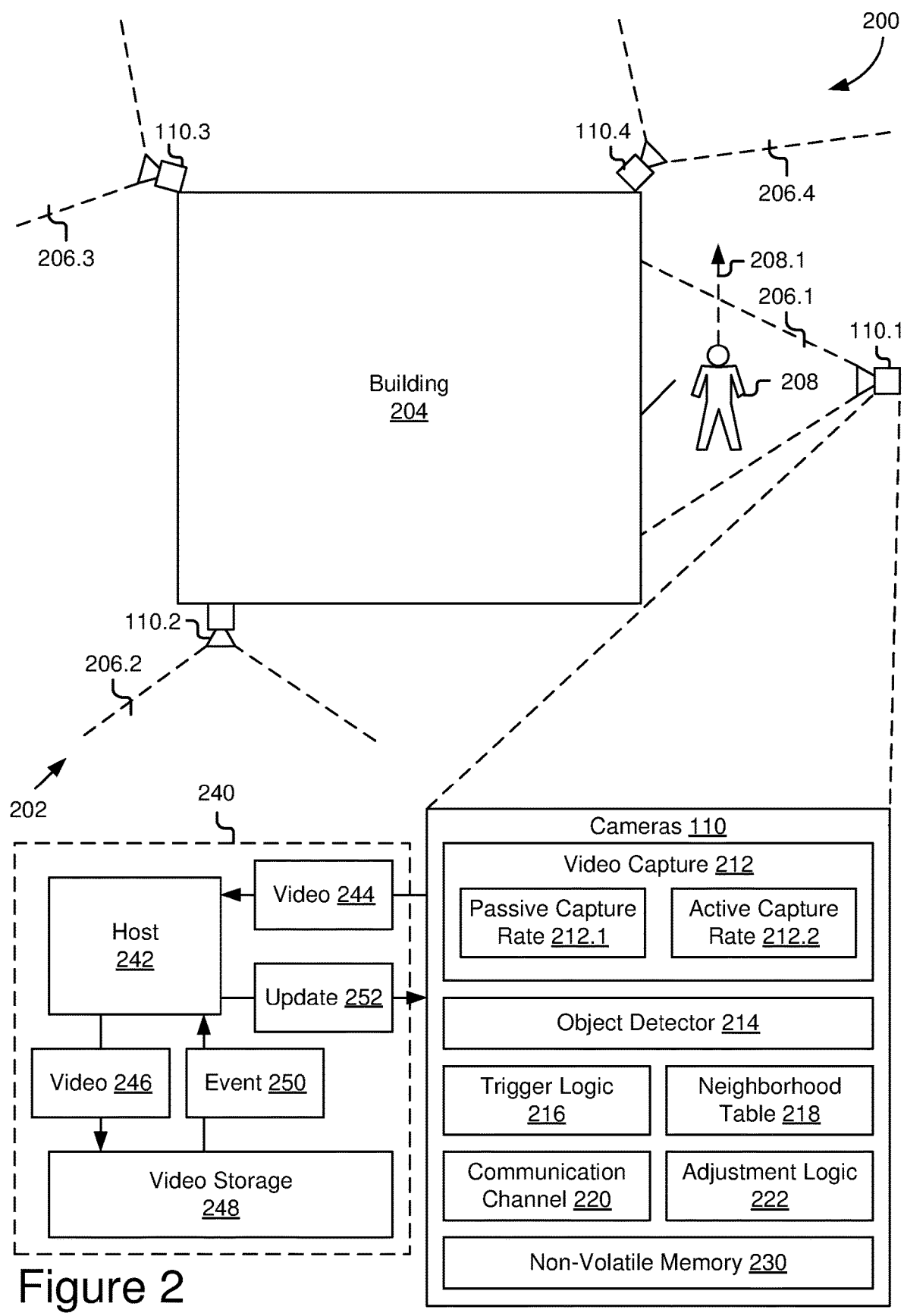
FIG. 2 schematically illustrates multiple networked video cameras configured for using predictive adjustment to modify video capture operations, such as may be used by the computer-based surveillance system of FIG. 1.

FIG. 2 shows schematic representations of multiple networked video cameras configured for using predictive adjustment to modify video capture operations, implemented in a computer-based surveillance system 200, such as surveillance system 100 in FIG. 1. In the example configurations shown, camera 110 is configured for onboard capture and analysis of video data, but similar functions may be implemented through a host 242, such as network video recorder 130 described above, as shown in block 240. In camera environment 202, the four networked video cameras 110.1-110.4 are located around the outside of a building 204, with camera 110.1 having a view of a door of building 204 and cameras 110.2-110.4 being spaced around the exterior without overlapping fields of view. Upon installation, cameras 110 have known locations with known spatial relationships to one another and defined fields of view 206. For example, the location and its relative direction to each other camera may be defined in terms of vectors for each camera. Similarly, fields of view 206 may be defined in terms of two or more bounding vectors and may include default position and maximum ranges in each direction of adjustment if equipped with PTZ actuators.

Assume that the top of the figure is north, and it is an overhead view of camera environment 202. In the example shown, camera 110.1 is located to the east of building 204 and has field of view 206.1 directed at a door in the east wall of the building. Camera 110.2 is on the southwest corner of building 204 and has field of view 206.2, generally south. Camera 110.3 is on the northwest corner of building 204 and has field of view 206.3, generally northwest. Camera 110.4 is on the northeast corner of building 204 and has field of view 206.4, generally northeast. None of the cameras have overlapping fields of view and may not be capable of simultaneously capturing the same object of interest.

Cameras 110 have been deployed to monitor their respective fields of view 206 for object detection and related object detection event handling, such as alerts, selective archival storage, etc. For example, cameras 110 may be placed in their respective surveillance locations to detect object of interest 208 (in this case, a person) when it moves into their respective fields of view 206 along path of movement 208.1. Other example objects of interest may include vehicles, animals, equipment, etc. In some embodiments, cameras 110 may be configured for video capture 212 based on different video capture rates. For example, cameras 110 may include a passive video capture rate 212.1 that includes lower quality video (e.g., lower pixel count and/or frame rate) to save storage space and/or network bandwidth for operating periods when no objects of interest are likely to be present in the field of view. Cameras 110 may include an active video capture rate 212.2 that includes higher quality video (e.g., higher pixel count and/or frame rate) to provide better video data for analysis, display, and/or storage of possible object detection events.

Once camera 110.1 has detected object of interest 208, it may be advantageous to predictively and selectively adjust the video capture operations of the other cameras. While it may be possible to alert all cameras to modify their video capture operations, doing so every time any of the cameras detected an object of interest would result in a waste of storage, network bandwidth, and other resources. In some configurations, competition for constrained resources in the system, such as limited network bandwidth and/or storage channels, may prevent all cameras from operating at active capture rate 212.2 at the same time and/or for extended periods. Therefore, prediction of which camera is most likely to have the object enter its field of view may be desirable and allow only that camera to modify its video capture operations. In the example shown, object of interest 208 is on the east side of the building and moving north. It will soon leave field of view 206.1 and is most likely to next enter field of view 206.4 of camera 110.4. If camera 110.4 modifies its video capture operations, such as by switching to its active capture rate, pivoting to its south-most actuator position, prioritizing the object detector for the object type of the object of interest, and other changes of video capture operating parameters, before object of interest 208 enters field of view 206.1, it may maximize the chances of capturing high-quality images of the object to support further detection, recognition, monitoring, or other analysis.

Cameras 110 may have been deployed with object detectors 214 configured to detect objects of interest using video data captured at their passive capture rate 212.1 and/or active capture rate 212.2. For example, object detectors 214 may be trained on low-quality video to detect one or more objects of interest at a relatively low confidence threshold to trigger active capture rate 212.2 and processing of additional video data at the higher quality and with an object detector trained on higher quality data to confirm object detection, enable classification and/or object recognition, or support other analysis. Alternately, other sensors, such as motion sensors, audio sensors, etc. or detection algorithms, such as video tripwires, etc., may be used to initially trigger active capture rate 212.2 for a camera when an object of interest initially enters camera environment 202. In some configurations, additional processing of the high-quality video data may include classification of the object type and/or determination of a direction of travel for the object of interest.

Cameras 110 may include trigger logic 216 for determining a video event that triggers predictive adjustment of other video cameras. For example, trigger logic 216 may be based on one or more parameters of the detected object and/or subsequent processing. In some configurations, objects of specific types, such as people, vehicles, or animals, may be a trigger condition and a direction of motion that will take the object out of the current camera's field of view may be another trigger condition. If the trigger conditions are met, trigger logic 216 may access neighborhood table 218 to determine which other camera or cameras should be modified and, in some configurations, what those modifications should be. For example, neighborhood table 218 may include entries for each other video camera that is indexed by comparing direction of travel 208.1 to the spatial relationship vectors between camera 110.1 and each of the other cameras. For example, a range of directions of travel generally north to northeast may index the entry for camera 110.4 and indicate the set of video capture parameters most likely to capture the object of interest entering from the south side of field of view 206.4.

Cameras 110 may include a communication channel 220 for sending one or more messages, such as a message to update video capture parameters to prepare for an incoming object, to other cameras. For example, cameras 110 may use a camera identifier determined from neighborhood table 218 for the most likely camera to next see the object and include a messaging protocol to address a video capture update message to that camera identifier. In some configurations, cameras 110 may be internet protocol (IP) cameras on a common network and communication channel 220 may be configured for peer-to-peer communications through a network interface. In some configurations, cameras 110 may include a network or direct connection to host 242 and communication channel 220 may be configured to only communicate with host 242. In such configurations, host 242 may be configured as a router for communications among cameras and/or be configured to process the message from the detecting camera and generate a corresponding video capture update message to send to the predicted camera.

Cameras 110 may include adjustment logic 222 configured to receive video capture update messages and adjust video capture operating parameters based on such messages. For example, adjustment logic 222 may receive and parse the message from the detecting camera to determine a set of video capture operating parameters based on the object type, predicted direction of entry into the field of view, and other parameters to assist in modifying the video capture of the predicted camera. In some configurations, neighborhood table 218 may be configured with sets of operating parameters indexed by object type and direction and the applicable set of operating parameters may be included in the message or the object parameters in the message may allow the receiving camera to determine the set of operating parameters from the table. Adjustment logic 222 may use the modified parameters to initiate changes in the operation of camera actuators, encoders, analysis, and/or storage functions in response to the message. In some configurations, adjustment logic 222 in the receiving camera may also be configured to recognize when that camera is already engaged in high-priority video capture (such as due to a different object of interest or event) and may reject predictive updates that would negatively impact the current video capture operations.

Cameras 110 may include non-volatile memory 230 configured to store video data captured by that video camera. As described above, on-camera memory may include a limited capacity and cameras 110 may send video data through communication channel 220 to be stored in other memory systems, which may include the memory of other cameras, host 242, and/or video storage 248 accessible through host 242. In some configurations, modification of video capture operating parameters may include increasing the quality of captured video (in terms of both sample rate and encoding) and a commensurate increase in the amount of storage capacity used to store such video.

Block 240 shows an alternate configuration where communication and processing of video data and messaging to cameras 110 may be executed or supported by host 242. For example, cameras 110 may include initial object detection, but utilize host 242 for further processing of high-quality video data, determination of video events, evaluation of predictive conditions for notifying other cameras, and sending video capture update messages to other cameras. In some configurations, cameras 110 may be configured to send video data streams to host 242 and all other operations may be localized in host 242 and video storage 248 until the video capture update message is sent to the other camera or cameras.

In some configurations, video data 244 is sent from cameras 110 to host 242. For example, host 242 may receive all captured video data for storage to video storage 248 and/or may selectively receive captured video based on one or more trigger conditions, such as described above for trigger logic 216 and initiating higher quality video capture. Host 242 may be configured to store received video data 244 to video storage 248 as video data 246. In some configurations, host 242 may process video data 244 to generate video data 246, such as encoding or re-encoding, metadata tagging, or other processing or analysis prior to storage. Video storage 248 may include any variety of non-volatile memory for storing video data and may include a variety of storage tiers and locations, including local SSDs and/or HDDs and/or one or more remote storage systems or cloud storage. In some configurations, video storage 248 may support more robust and/or processor intensive analysis of video data, such as more complex object detection, classification, recognition, and/or motion tracking models. In the example shown, this off-camera processing may determine video event 250 and provide a notification of the video event to host 242. In some configurations, host 242 may be configured with trigger logic and a neighborhood table for determining predicted cameras and the modified video capture parameters that should be used to increase the chances of capturing additional video of object of interest 208. For example, based on a object detection video event from the video data of camera 110.1, host 242 may determine that object of interest 208 is headed in the direction of video camera 110.4 and generate a video capture update message for camera 110.4. Host 242 may send update message 252 to the predicted video cameras, such as video camera 110.4. The receiving video cameras may then process the parameter changes in the video capture update message to modify video capture operations.

Figure 3:
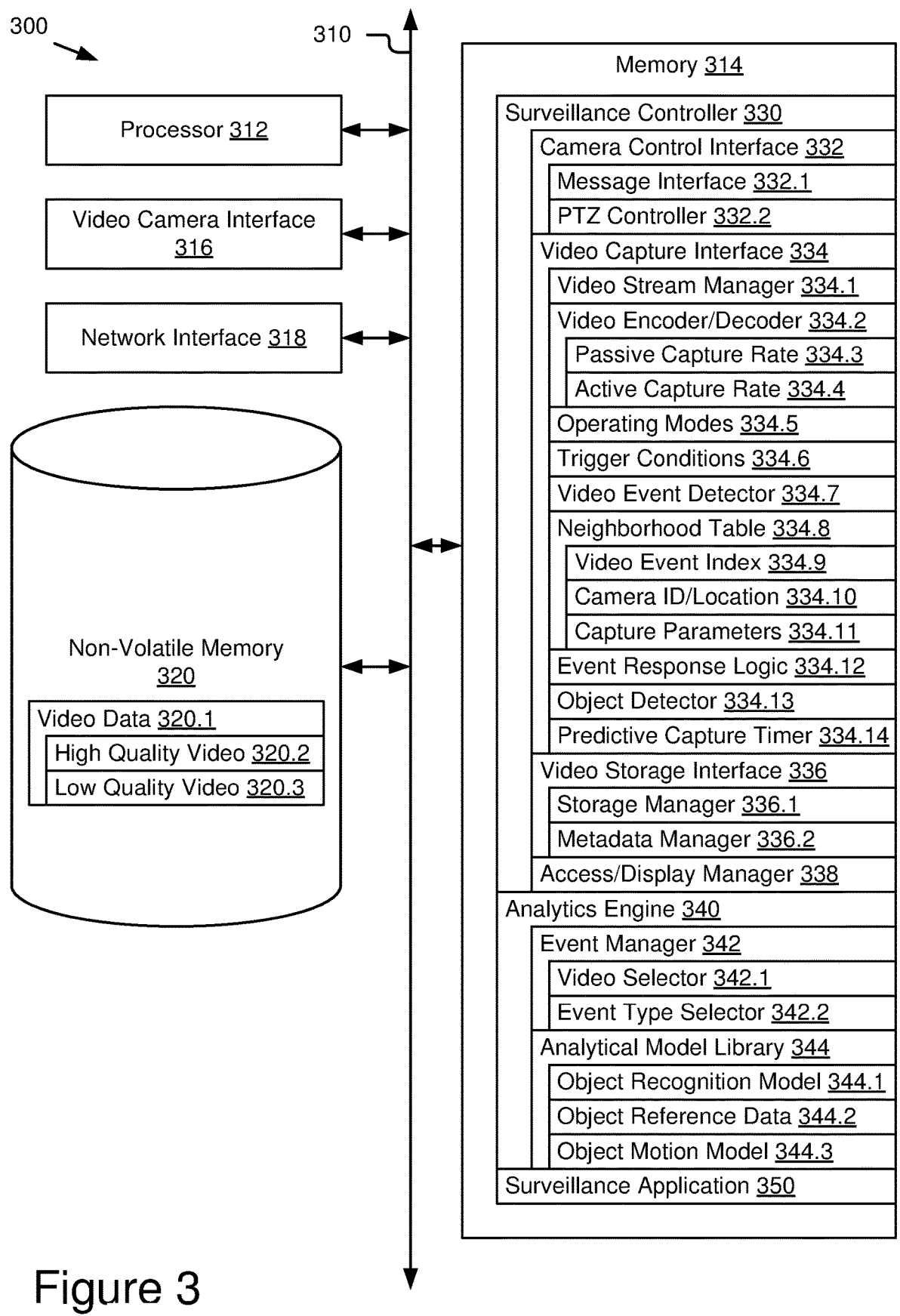
FIG. 3 schematically illustrates some elements of the computer-based surveillance system of FIG. 1.

FIG. 3 schematically shows selected modules of a surveillance system 300 configured for predictively modifying the video capture operations of selected cameras based on their spatial relationship to a camera that detected a video event. Surveillance system 300 may incorporate elements and configurations similar to those shown in FIGS. 1-2. For example, surveillance system 300 may be configured in a network video recorder similar to network video recorder 130. In some embodiments, one or more of the selected modules may access or be instantiated in the processors, memories, and other resources of video cameras configured for video capture, similar to video cameras 110, and/or user devices configured for video monitoring, similar to user device 170. For example, a video camera and its embedded or attached compute resources may be configured with some or all functions of surveillance controller 330 and/or those functions may be shared between the video camera controller and a network video recorder or video surveillance as a service (VSaaS) server. Similarly, some or all of analytics engine 340 may instantiated in the video camera and/or shared with other surveillance system components.

Surveillance system 300 and/or any component thereof may include a bus 310 interconnecting at least one processor 312, at least one memory 314, and at least one interface, such as video camera interface 316 and network interface 318. Bus 310 may include one or more conductors that permit communication among the components of surveillance system 300. Processor 312 may include any type of processor or microprocessor that interprets and executes instructions or operations. Memory 314 may include a random access memory (RAM) or another type of dynamic storage device that stores information and instructions for execution by processor 312 and/or a read only memory (ROM) or another type of static storage device that stores static information and instructions for use by processor 312 and/or any suitable storage element such as a hard disk or a solid state storage element.

Video camera interface 316 may be configured for connection with one or more video cameras. For example, video camera interface 316 may include a plurality of ethernet ports and supporting protocols compatible with PoE standards for connecting to a plurality of cameras. In some embodiments, video camera interface 316 may include a PoE network switch for providing power to connected cameras and routing data packets to and from connected cameras, such as control and video data.

Network interface 318 may include one or more wired or wireless network connections to network, similar to network 102. Network interface 318 may include a physical interface, such as an ethernet port, and related hardware and software protocols for communication over the network, such as a network interface card or wireless adapter.

Surveillance system 300 may include one or more non-volatile memory devices 320 configured to store video data. For example, non-volatile memory devices 320 may include a plurality of flash memory packages organized as an addressable memory array and/or one or more solid state drives or hard disk drives. In some embodiments, non-volatile memory devices 320 may include a plurality of storage devices within, attached to, or accessible by video cameras and/or a network video recorder for storing and accessing video data.

Surveillance system 300 may include a plurality of modules or subsystems that are stored and/or instantiated in memory 314 for execution by processor 312 as instructions or operations. For example, memory 314 may include a surveillance controller 330 configured to control a plurality of video cameras, capture and store video streams from those cameras, and enable user access, such as through surveillance application 350. Memory 314 may include an analytics engine configured to analyze video data to detect events for use by surveillance controller 330 and/or surveillance application 350. Memory 314 may include a surveillance application configured to provide a user interface for monitoring, reviewing, and managing surveillance video and/or surveillance system 300.

Surveillance controller 330 may include interface protocols, functions, parameters, and data structures for connecting to and controlling cameras, capturing and storing video data from those cameras, and interfacing with analytics engine 340 and surveillance application 350. For example, surveillance controller 330 may be an embedded firmware application and corresponding hardware in a network video recorder configured for network and/or direct communication with a set of associated video cameras. Surveillance controller 330 may be configured as a central collection point for video streams from the associated video cameras that enables analysis of captured video data by analytics engine 340 and presentation of video streams and video event alerts to a user through surveillance application 350. In some embodiments, some or all functions of surveillance controller 330 may be onboard each video camera and no network video recorder may be required.

In some embodiments, surveillance controller 330 may include a plurality of hardware and/or software modules configured to use processor 312 and memory 314 to handle or manage defined operations of surveillance controller 330. For example, surveillance controller 330 may include a camera control interface 332, a video capture interface 334, a video storage interface 336, and an access and display manager 338.

Camera control interface 332 may include camera interface protocols and a set of functions, parameters, and data structures for using, configuring, communicating with, and providing command messages to cameras through video camera interface 316 and/or network interface 318. For example, camera control interface 332 may include an API and command set for interacting with control circuit in each camera to access one or more camera functions. In some embodiments, camera control interface 332 may be configured to set video configuration parameters for camera image sensors, microphones, and/or video encoders, access pan-tilt-zoom features, set or modify camera-based motion detection, tripwire, object detection, and/or low light detection parameters, and/or otherwise manage operation of cameras. For example, camera control interface 332 may maintain a video camera configuration table, pages, or similar data structures that includes entries for each video camera being managed and their respective camera-specific configuration parameters, active control features (such as PTZ control), and other configuration and control information for managing the cameras. In some embodiments, each camera may be assigned a unique camera identifier that may be used by surveillance controller 330, analytics engine 340, and/or surveillance application 350 to associate video data with the camera from which it was received.

In some embodiments, camera control interface 332 may include a message interface 332.1 for sending and/or receiving control messages with one or more cameras. For example, message interface 332.1 may include a messaging protocol for adjusting operating parameter values for each camera. In some configurations, camera-specific configuration parameters may include a range of operating values and corresponding conditions for using those operating parameters for video capture operations. For example, different sets of configuration parameters may be used for different times, environmental conditions, or operating modes for each camera. Message interface 332.1 may enable surveillance controller 330 to modify the current operating configuration parameters of a camera. For example, message interface 332.1 may be configured to send a video capture update message to change one or more video capture parameters for a selected video camera. In some configurations, message interface 332.1 may use internet protocol, master-slave, and/or multi-master messaging over video camera interface 316 and/or network interface 318 to send messages to selected cameras. In some configurations, application-level messaging may be used to send, parse, and respond to messages and enable the cameras to determine parameter changes from the message content to initiate changes in video capture operations. In some configurations, message interface 332.1 may enable surveillance controller 330 to directly change memory locations in the cameras that store the configuration parameters to be changed using one or more update messages. In some configurations, message interface 332.1 may be integrated in or responsive to video capture interface 334 to enable surveillance controller 330 to respond to video events by sending video capture update messages to selected cameras.

In some embodiments, camera control interface 332 may include a PTZ controller 332.2 for one or more video cameras. For example, each video camera may be equipped with a PTZ control unit and associated motor and/or digital controllers and command interface for moving that video camera from its current position to pan, zoom, and/or tilt to change the field of view. In some embodiments, PTZ controller 332.2 may include a remote controller unit that sends PTZ control commands to adjust camera position and/or zoom in real-time, such as responsive to the detection of an object of interest in the field of view (but not ideally positioned in the field of view). In some embodiments, PTZ controller 332.2 may include a set of configuration settings for auto-tracking or auto-capture functions within the selected video camera. For example, one or more cameras may include an auto-capture feature for detecting objects of interest and then centering and zooming on the detected object. PTZ controller 332.2 may be used to configure the parameters of the auto-capture feature, such as classes of objects (e.g., humans, human faces, vehicles, license plates, etc.) to be captured, PTZ ranges or limits, timing, quality or reliability thresholds, etc. In some embodiments, PTZ controller 332.2 may be configured for responding to an update message (from message interface 332.1) regarding video events that are outside the current field of view of the camera in order to predictively change video capture operating parameters in anticipation of an object entering the field of view. For example, responsive to a video event for an object approaching from the direction of another camera, PTZ controller 332.2 may be commanded to pan the camera toward the other camera or an anticipated intercept point of an object of interest in the adjusted field of view.

Video capture interface 334 may include camera interface protocols and a set of functions, parameters, and data structures for receiving video streams from associated cameras. For example, video capture interface 334 may include video data channels and related data buffers for managing a plurality of camera video data streams. In some embodiments, each video camera may be allocated a dedicated video channel for continuously and/or selectively sending its video stream to video capture interface 334. For example, each video camera configured as a primary video camera may have a dedicated video channel for their respective primary video streams. Video capture interface 334 may be configured to pass each received video stream to video storage interface 336, analytics engine 340, and/or access/display manager 338. For example, received video streams may be buffered by video capture interface before being streamed to video storage interface 336, analytics engine 340, and access/display manager 338. In some embodiments, video capture interface 334 may receive camera video metadata describing the camera video format, time and location information, and event or condition tags based on on-board camera analytics. Video capture interface 334 may generate additional video metadata for video format changes and provide video metadata to video storage interface 336 and/or other components. In some embodiments, video capture interface 334 may support an audio channel or audio track for audio data synchronized to the captured video data. For example, one or more video formats supported may include one or more audio channels for audio data from one or more microphones associated with the video camera. In some embodiments, video capture interface 334 may use video events detected from one camera to trigger changes in video capture operations, such as video capture operating modes and video capture rates, of one or more other video cameras in surveillance system 300.

In some embodiments, video capture interface 334 may include a video stream manager 334.1 configured to identify and manage the plurality of video streams being received from the cameras. For example, video stream manager 334.1 may manage video buffer allocation and space, processing of video streams from a camera video format to another video format, flushing of buffered video to storage through video storage interface 336 and/or for display via access/display manager 338. In some embodiments, video stream manager 336.1 may send video streams to analytics engine 340 for analysis and/or provide a notification to analytics engine 340 of the availability and storage location of video data for analysis in non-volatile memory 320 (as determined by video storage interface 336). In some embodiments, video stream manager 334.1 may include configurable video paths. For example, the storage path (through video storage interface 336), the display path (through access/display manager 338), and/or the analytics path (through analytics engine 340) may each be configured for specific processing, priority, and timing. In some embodiments, one or more selectable storage paths and corresponding storage locations or storage modes may be associated with different video capture operating modes and/or video capture rates and may be selected in response to triggers, such as video event triggers.

In some embodiments, video stream manager 334.1 may be configured to use encoder/decoder 334.2 to encode camera video streams in a desired video format. In some embodiments, encoder/decoder 334.2 may be configured to receive the raw video data stream from the image sensor and determine the video data format to be used, including a capture rate of the raw data from the image sensor. For example, the video capture rate may include a number of pixels or resolution of the image data from the image sensor and a frame rate determining how frequently the pixel values are determined. In some embodiments, encoder/decoder 334.2 may support two or more selectable video capture rates and corresponding video formats. For example, encoder/decoder 334.2 may support a passive video capture rate 334.3 and an active video capture rate 334.4. Passive video capture rate 334.3 may have a lower rate than active video capture rate 334.4 such that passive video capture rate 334.3 captures less video data (e.g., low quality video 320.3) and requires less processing, network bandwidth, and/or data storage, but with lower video quality that may be less effective for display and/or analytics. Active video capture rate 334.4 may capture more video data with higher video quality (e.g., high quality video 320.3) for display and analytics, but at the cost of increased processor use, network bandwidth, and/or data storage. In some embodiments, video encoder/decoder 334.2 may support more than two selectable video capture rates. In some embodiments, in-camera video encoders may encode video data from the image sensor in a first (camera) video format and video stream manager 334.1 may use encoder/decoder 334.2 to re-encode them in one or more other formats. For example, video stream manager 334.1 may use encoder/decoder 334.2 to change the resolution, image size, frame rate, codec, compression factor, color/gray-scale, or other video format parameters.

In some embodiments, video capture interface 334 may include a plurality of operating modes 334.5. For example, a standby operating mode may include a low power state in which the video camera is not actively capturing video and a normal operating mode may include a normal power state where the video camera may activate any of its resources, including capturing video using its image sensor and processor. In some embodiments, operating modes 334.5 may include low light operating modes for low light conditions, motion/tripwire-only modes where only low-level processing of image sensor data (or a separate motion sensor) is active without video capture, and other operating modes. In some embodiments, one or more operating modes may be associated with specific video capture rates and encoding formats. For example, a passive video capture mode may use passive video capture rate 334.3 and an active video capture mode may use active video capture rate 334.4. Video cameras may use different operating modes during different operating periods and operating modes may be used to modify one or more video capture operations. For example, each operating mode may define whether or not video capture is suspended or operating and, if operating, what set of video capture parameters are being used, such as video capture rate (resolution and frame rate), encoding codec, filters, etc.

In some embodiments, video capture interface 334 may include trigger conditions 334.6 for moving between operating modes 334.5. For example, video capture interface 334 may have a default operating mode and one or more other operating modes that are triggered when specific conditions are met. For example, a camera may be configured to default to normal operating mode but change to low-light operating mode when light levels drop below a threshold. In some configurations, a camera may include passive video capture mode as a default mode for continuous video surveillance, due to the lower resource usage, and include one or more triggers conditions 334.6 for changing the operating mode. For example, when motion, a video tripwire, or an object are detected from the passive video data, the video capture interface 334 may change the operating mode to the active video capture mode for the camera that detected the condition. However, these video-based triggers may be less reliable using passive video data and there may be a lag between an object entering the field of view and successfully triggering a video condition, including the required processing time for the monitoring analytics. In some embodiments, video capture interface 334 may include one or more trigger conditions 334.6 based on predictively changing operating modes based on video events occurring at other video cameras. For example, video capture interface 334 may include an video event detector 334.7 that determines video events from each camera and uses neighborhood table 334.8 to determine which other cameras should change operating modes and what those operating mode changes should be.

Video event detector 334.7 may support detection of one or more video event types based on the video data received by surveillance controller 330. For example, incoming video streams for each camera may be processed through one or more analytical models, such as object detector 334.13, to determine whether an object of interest appears within a frame of video data at a selected confidence threshold. In some configurations, video event detector 334.7 may use video event parameters generated from one or more sources, such as video metadata, time, camera-detected events (e.g., motion sensors, video tripwires, low-weight on-board object detectors, etc.), and output from one or more analytics engines. For example, an object may be detected by a camera's onboard object detector and, based on the type of object detector, assigned an object type parameter, as well as detection time, and location in frame. An analytics engine with an object motion tracking model may then process a series of video frames in the video data stream to determine a direction of travel of the detected object. The object detection may trigger video event detector 334.7 to identify a video event and initiate event response logic 334.12 to evaluate neighborhood table 334.8 to determine whether video capture parameters of one or more other cameras should be updated. In some configurations, video event detector 334.7 may isolate video frames or a portion of the video data (e.g., bounding box) corresponding to an object of interest to include among the video event parameters, along with other object data.

Neighborhood table 334.8 may include a data structure for using video event parameters to determine which other cameras would benefit from a change in operating mode to improve the likelihood of capturing additional video data relevant to the triggering video event. For example, where an object of interest is detected by one camera neighborhood table 334.8 may include entries for each other camera that indicates their spatial relationship to the detecting camera. In some configurations, neighborhood table 334.8 may include a video event index 334.9 comprising one or more index fields corresponding to relevant event parameters. For example, video event index 334.9 may include a combination of type of object and direction of travel parameters for a detected object of interest. In some configurations, each entry in neighborhood table 334.8 may include a camera identifier and location parameters 334.10. For example, the same camera identifier used for managing camera configuration parameters may be used and the location parameters may include absolute spatial relation information (e.g., coordinates on a map of the surveillance environment) and/or relative direction information, such as vector data providing direction and distance between cameras. More complex spatial models may be implemented that define fields of view for each camera. In some configurations, each entry may also include a set of video capture parameters 334.11 that correspond to an increased likelihood of capturing a subsequent video event in the field of view of that camera. For example, video capture parameters 334.11 for a spatially adjacent camera may include active capture rate parameters and PTZ control parameters for moving the camera to the nearest position for its field of view. In some configurations, neighborhood table 334.8 may include multiple entries for each camera relative to each other camera and indexed by direction of motion parameters to determine whether and which other cameras identifiers and sets of video capture parameters are selected in response to any given video event.

In some embodiments, event response logic 334.11 may include logical rules for applying video events and their corresponding video event parameters to trigger conditions 334.6 for triggering one or more operating modes 334.5. For example, video response logic 334.11 may include a set of threshold values and logical rules for applying those threshold values to trigger modification of the video capture operations. In some configurations, video response logic 334.11 may include a set of active capture thresholds for initiating active video capture rate 334.3 and/or a corresponding active video capture mode. In some configurations, event response logic 334.11 may use neighborhood table 334.8 for determine whether and what cameras should have their video capture parameters changed. For example, video event detector 334.7 may use video event parameters to search video event index 334.9 to determine whether the video event should trigger operating mode changes for any of the other video cameras. If no video event index values match the corresponding video event parameters, then no update messages may be initiated. Similarly, if multiple entries are returned in the search for different cameras, then update messages may be sent to multiple cameras. In some configurations, threshold values used by event response logic 334.11 may include confidence thresholds for the object detection or classification and/or direction of motion. For example, video event detector 334.7 may return a video event with an object type, type confidence value, direction of motion value, and motion confidence value. If the object type matches an object of interest type, the type confidence value meets a type confidence threshold (e.g., 50%), and the direction of motion value meets the motion confidence threshold (e.g., 50%), then audio response logic 334.11 may trigger message interface 332.1 to send a video capture update message to the selected camera or cameras. In some embodiments, additional and/or alternative logical rule sets and/or entries in neighborhood table 334.8 for applying video event parameters to initializing video capture, triggering PTZ movement toward a predicted intercept location with the camera field of view, and/or changing data storage and/or processing paths may be included in event response logic 334.12.

In some embodiments, video capture interface 334 may be configured with an object detector 334.12 supporting detection of one or more object classes, such as people, animals, motor vehicles, etc. For example, object detector 334.12 may operate on captured video data received from a video camera to detect whether an object of interest is present in the video data. In some embodiments, object detector 334.12 may include a lightweight object detection model that can be processed in near real-time with the limited processing bandwidth of the video camera and/or associated compute resources. In some embodiments, the object detection model may operate on the video data in the video stream and return a flag or class for the object type detected, an object quality of confidence metric, object position, and/or object boundary data, such as two horizontal positions and two vertical positions to define a boundary box within the video frame. In some embodiments, object detector 334.12 may have one or more associated object confidence thresholds for evaluating the object confidence value for each object detection event. For example, object detector 334.12 may include an object detection threshold, below which the presence of an object is not treated as sufficiently certain to raise an object detection event, such as 50% reliability. In some embodiments, object detector 334.12 may be used to identify object detection events and raise corresponding alerts to video event detector 334.7.

In some embodiments, video capture interface 334 may include a predictive capture timer 334.14 configured to determine how long a camera that predictively changes its video capture operations should wait to see whether the object of interest is detected or return to default operation. For example, predictive capture timer 334.14 may use a predefined operating period after the sending of the update message and/or change of parameters by the selected camera to determine a duration to wait for the object of interest to be detectable within its field of view. In some configurations, the duration for the predictive operating period may be a default value, predetermined for each spatial relationship (e.g., provided in the corresponding entry in neighborhood table 334.8), and/or dynamically generated based on the distance between cameras and a velocity from the object motion model. Once the duration for the predictive operating period is determined for a particular video event and camera, predictive capture timer 334.14 may monitor the elapsed time and return the camera to its default operating mode when the duration is met. For example, when the time has elapsed, message interface 332.1 may send another update message to return the camera to default operation. Alternatively, the parameters sent in the original update message may include a duration parameter and the camera may execute its own predictive capture timer to automatically return to default operation when the time has elapsed.

Video storage interface 336 may include storage interface protocols and a set of functions, parameters, and data structures for managing storage of video data 320.1 in non-volatile memory 320, such as storage devices and/or network video storage, for later retrieval and use by access/display manager 338 and/or analytics engine 340. For example, video storage interface 336 may write camera video stream data from video data buffers and/or storage path video data from video capture interface 334 to non-volatile memory 320. In some embodiments, audio data may be stored in separate audio data files or objects and/or as synchronized audio data in audio tracks or channels of video data 320.1. In some embodiments, video storage interface 336 may include a storage manager 336.1 configured to manage video storage space in non-volatile memory 320 in accordance with one or more operating modes 334.5, data retention and/or data archiving schemes. For example, surveillance system 300 may support continuous and/or triggered recording of video data from associated cameras and storage manager 336.1 may include logic for enforcing a data retention and overwriting policy whereby the fixed storage space of non-volatile memory 320 is recycled for storing a recent period of captured video, video data meeting specific retention criteria, and/or deleting or archiving video data after one or more periods of time defined in the data retention policy. In some embodiments, storage manager 336.1 may support different storage locations for high quality video 320.2 captured during active video capture modes and low quality video 320.3 captured during passive video capture modes. Video storage interface 336 may also include a metadata manager 336.2 to receive and store video metadata as tags or metadata tracks in the video data or in an associated metadata table, file, or similar data structure associated with the corresponding video data objects.

Access/display manager 338 may include APIs and a set of functions, parameters, and data structures for displaying video from video capture interface 334 and/or video storage interface 336 to a user display application, such as surveillance application 350. For example, access/display manager 338 may include a monitoring or display configuration for displaying one or more video streams in real-time or near real-time on a graphical user display of a user device and/or receive video navigation commands from the user device to selectively display stored video data from non-volatile memory 320. In some embodiments, access/display manager 338 may maintain an index of real-time/near real-time video streams and/or stored or archived video streams that are available for access by surveillance application 350. In some embodiments, the video index may include a corresponding metadata index that includes video data parameters (e.g., time, location, camera identifier, format, low light/normal light, etc.), detected audio and video event metadata (event time, location, type, parameters, etc.), and/or video management parameters (expiration, active/archive, access control, etc.) for use in displaying and managing video data. Access/display manager 338 may be configured to support surveillance application 350 when instantiated in the same computing device as surveillance controller 330, directly attached to the computing device hosting surveillance controller 330, and/or via a network within a LAN, WAN, VPN, or the internet. In some embodiments, access/display manager 338 may provide selective access to user video format 336.2 and/or video streams allocated by video capture interface 334 to the user video path.

Analytics engine 340 may include interface protocols, functions, parameters, and data structures for analyzing video data to detect video events, add them to video metadata, and/or raise alerts, such as through surveillance application 350. For example, analytics engine 340 may be an embedded firmware application and corresponding hardware in a network video recorder configured for local analysis of video data captured from associated video cameras and may be integral to or accessible by surveillance controller 330. In some embodiments, analytics engine 340 may run on a separate computing device from surveillance controller 330, such as a video camera with analytics capabilities, a dedicated analytics appliance, data storage system with analytics capabilities, or a cloud-based analytics service. In some embodiments, analytics engine 340 may operate in real-time or near real-time on video data received by video capture interface 334, delayed processing of video data stored by video storage interface 336, and/or a combination thereof based on the nature (and processing requirements) of the video events, volume of video to be processed, and other factors. In some embodiments, surveillance system 200 may comprise a plurality of analytics engines configured for a particular type of event and corresponding event detection algorithm or model.

In some embodiments, analytics engine 340 may include a plurality of hardware and/or software modules configured to use processor 312 and memory 314 to handle or manage defined operations of analytics engine 340. For example, analytics engine 340 may include an event manager 342 and analytical model library 344. Analytics engine 340 may be configured to run one or more event detection algorithms for determining, tagging, and/or initiating alerts or other actions in response to detected video events. In some embodiments, analytics engine 340 may be configured to tag or build metadata structures that map detected events to time and image location markers for the video stream from which they are detected. For example, analytics engine 340 may use motion, tripwire, object recognition, facial recognition, audio detection, speech recognition, and/or other algorithms to determine events occurring in a video stream and tag them in a corresponding metadata track and/or separate metadata table associated with the video data object.

Event manager 342 may include storage interface and/or buffer interface protocols and a set of functions, parameters, and data structures for processing target video streams for predefined event types and updating or adding metadata parameters describing the detected video events. For example, event manager 342 may be configured to process all incoming video streams for surveillance controller 330 and/or selectively process video data based on user selections (through surveillance application 350) or metadata criteria received from the video camera or video capture interface 334. In some embodiments, event manager 342 may include, support, or supplement event detection by surveillance controller 330, such as video events from video event detector 334.7 and/or object detection events from object detector 334.12. In some embodiments, event manager 342 may include a video selector 342.1 configured to select target video streams or video data sets for analysis, including associated audio data. For example, video selector 342.1 may identify a real-time video stream for near real time analysis or a bounded video data set, such as video with a specified camera identifier and timestamps between beginning and ending time markers and/or including a defined set of metadata parameters. Event manager 342 may include an event type selector 342.2 configured to determine one or more event types to be detected from the selected video data. For example, an analytics configuration may be configured to analyze the selected video stream for a predefined set of audio event detection, motion detection, tripwire detection, object recognition, facial recognition, speech recognition, and/or similar video event types. Each event type may map or correspond to an analytical model type, set of parameters, and one or model weights for defining an event detection algorithm stored in analytical model library 344 for use by analytics engine 340 to detect potential video events (and/or predictive audio events).

Analytical model library 344 may include an API and set of functions, parameters, and data structures for storing a plurality of analytical models for use by analytics engine 340 in processing video data. For example, analytical model library 344 may include a plurality of trained analytical models and corresponding event detection algorithms for different event types, target object classes (e.g., cars, license plates, equipment, people, etc.), and/or training conditions. In some embodiments, analytical model library 344 may also support audio analytical models and/or combined video with audio analytical models. Each analytical model may include a set of base equation(s) for the analytical model type, set of target parameters, and one or model weights that determine the event detection algorithm that will be used for the event detection processing. In some embodiments, at least some analytical models may be machine learning based models trained based on one or more sets of relevant reference data. For example, the base equations may be trained using the reference data sets to determine the model weights to be used in the resulting analytical model. Trained analytical models may be deployed in analytics engine 340 and/or surveillance controller 330. In some embodiments, analytics engine 340 may include or access training services for generating (training) or updating (retraining) analytical models in analytical model library 344.

In some embodiments, analytical model library 344 may include at least one object recognition model 344.1. For example, a motor vehicle recognition model may apply a set of weighted parameter values representing the relationships among sets of feature vectors for comparison with reference data (such as sets of feature vectors for known motor vehicles) and determination of a probabilistic reliability or correlation factor. Analytical model library 344 may include or access object reference data 344.2 for matching detected objects with previously identified (or recognized) reference objects. For example, the motor vehicle recognition model may be applied to a reference database of relevant motor vehicle images and/or feature sets extracted therefrom to provide vehicle reference data. In some embodiments, for any given detected object, object recognition model 344.1 may return one or more recognized matches and a corresponding reliability value. For example, the motor vehicle recognition model may return one or more known individuals from the reference data and corresponding reliability values, assuming at least one match is found that meets a threshold reliability value. In some configurations, the video event parameters for an initial object detection event may be used as reference data for matching a similar object detected on other video data from cameras. For example, once an object of interest is detected, the bounding box and image data it contains may be designated as reference data for subsequent object recognition calculations of other cameras detecting an object of the same type in response to receiving an update message.

In some embodiments, analytical model library 344 may include at least one object motion model 344.3 for tracking and predicting movement of an object of interest based on video data. For example, object motion model 344.3 may include an object motion tracking model that detects the same object frame-to-frame. In some configurations, object motion model 344.3 may leverage the bounding boxes for an object from frame-to-frame to track the motion of that object through the video frame. The motion of the detected object in the frame may then be translated by a spatial model into a likely direction of travel for the object itself. For example, for a particular camera position, movement to the right in frame may roughly correlate to northward movement in the surveillance environment and left movement may correlate to southward movement. Changes in size of the object may also be used to estimate movement into or out of the frame. In some configurations, object motion model 344.3 may be used to determine a direction of movement parameter for video event detector 334.7. Other models for determining or approximating direction of travel of an object of interest within video data may also be employed.

Surveillance application 350 may include interface protocols, functions, parameters, and data structures for providing a user interface for monitoring and reviewing surveillance video and/or managing surveillance system 300, such as through surveillance controller 330. For example, surveillance application 350 may be a software application running on a user device integral to, connected to, or in network communication with surveillance controller 330 and/or a hosting network video recorder. In some embodiments, surveillance application 350 may run on a separate computing device from surveillance controller 330, such as a personal computer, mobile device, or other user device. In some embodiments, surveillance application 350 may be configured to interact with APIs presented by access/display manager 338.

In some embodiments, surveillance application 350 may include a plurality of hardware and/or software modules configured to use processor 312 and memory 314 to handle or manage defined operations of surveillance application

350. For example, surveillance application 350 may include a video manager, an alert manager, and an analytics manager.

The video manager may include APIs and a set of functions, parameters, and data structures for navigating and displaying video streams from video cameras accessed through surveillance controller 330. For example, the video manager may include a graphical user interface and interactive controls for displaying lists, tables, thumbnails, or similar interface elements for selecting and displaying video streams for particular cameras, times, locations, and/or events. In some embodiments, the video manager may enable split screen display of multiple camera video streams. For example, the near real-time video streams (with a predetermined lag based on network lag, storage, and processing times) from all active cameras may be displayed on a monitoring interface or a set of video streams corresponding to a detected event may be displayed in an event review interface. In some embodiments, the video manager may include a data structure summarizing all video data stored in surveillance system 300 to enable the user to locate and view older surveillance video data. For example, a video management log or database may include entries for stored video data indexed by related metadata, such as video data parameters (e.g., time, location, camera identifier, format, low light/normal light, etc.), detected video event metadata (event time, location, type, parameters, etc.), and/or video management parameters (expiration, active/archive, access control, etc.).

The alert manager may include APIs and a set of functions, parameters, and data structures for setting, monitoring, and displaying alerts based on detected video events. For example, the user may define a set of trigger events that generate visual, audible, tactile, and/or notification-based (electronic mail, text message, automated call, etc.) alerts to a user device. In some embodiments, the alert manager may include a plurality of preset alert conditions with associated event parameters and allow a user to enable and disable alert types and/or change associated event parameters. In some embodiments, the alert manager may be configured to operate in conjunction with an event overlay function to overlay graphical elements representing detected events or event indicators on video streams displayed through the video manager. For example, detected motion, objects, or faces may be boxed or highlighted, tagged with relevant identifiers, or otherwise indicated in the video playback on the user device.

The analytics manager may include APIs and a set of functions, parameters, and data structures for selecting, training, and managing event detection algorithms. For example, the analytics manager may include a user interface to analytical model library 344 for one or more analytics engines 340. In some embodiments, the event detection algorithms may include a set of parameters and/or model weights that are preconfigured based on training data sets processed independent of surveillance system 300. For example, the analytics manager may include audio event detection and object detection algorithms for common objects/sources, situations, and camera configurations. In some embodiments, the analytics manager may include access to training services and/or preconfigured training data sets. For example, the analytics manager may enable the user to define training data sets for determining or refining event detection algorithm parameters and/or model weights based on predefined base algorithms or models. In some embodiments, the analytics manager may interface directly with analytics engine 340 for selecting, training, managing, and using the event detection algorithms configured through the analytics manager. In some embodiments, the analytics manager may interface with access/display manager 338 for accessing and managing one or more analytics engines 340.

Figure 4:
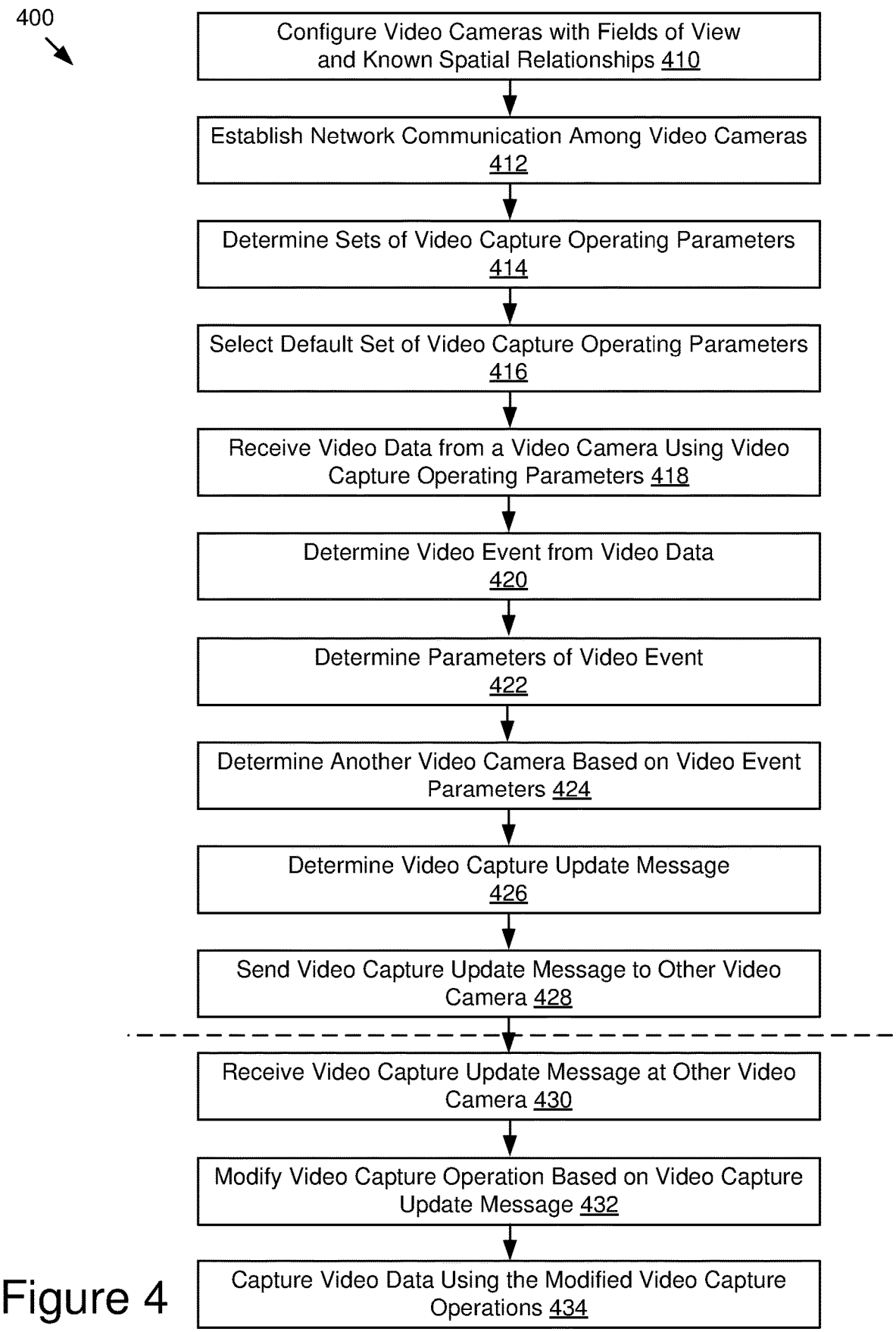
FIG. 4 is a flowchart of an example method of predictive modification of video capture operations among networked video cameras based on a video event detected by one camera modifying the operation of another camera.

As shown in FIG. 4, surveillance system 300 may be operated according to an example method for predictive modification of video capture operations among networked video cameras based on a video event detected by one camera modifying the operation of another camera, i.e., according to method 400 illustrated by blocks 410-434 in FIG. 4.

At block 410, a group of video cameras may be configured with respective fields of view and known spatial relationships between them. For example, a user may deploy a set of networked video camera in a surveillance location with fixed positions and fixed or moveable fields of view based on the orientation, size, and depth of field of the image sensors and associated lens(es).

At block 412, network communication may be established among the video cameras. For example, each camera may be configured with a network interface and corresponding network protocols for peer-to-peer communication and/or networked to a shared host, such as a network video recorder.

At block 414, sets of video capture operating parameters may be determined. For example, each video camera may be configured to support two or more selectable video capture rates, such as a passive video capture rate and an active video capture rate, and/or other video capture operating parameters.

At block 416, a default set of video capture operating parameters may be selected for each camera. For example, the video cameras may be configured to default to the passive video capture rate to conserve processing power, network bandwidth, and/or storage space until an object of interest is within or approaching the field of view.

At block 418, video data may be received from at least one video camera using a current set of video capture operating parameters. For example, a surveillance controller for the camera may continuously receive audio data from the audio sensor if any sound is detected (for example, based on a sound detection threshold).

At block 420, a video event may be determined from the video data. For example, the surveillance controller for one of the video cameras may detect an object of interest in its field of view.

At block 422, parameters of the video event may be determined. For example, the surveillance controller may determine an object type and a direction of motion for the object of interest.

At block 424, another video camera may be determined based on the video event parameters. For example, the surveillance controller may use the video event parameters to select at least one camera (and fewer than all cameras) that would be most likely to have the object of interest enter its field of view.

At block 426, a video capture update message may be determined. For example, the surveillance controller may generate a message to the predicted camera (or cameras) to trigger a change in video capture operating parameters of that camera prior to the object of interest entering its field of view.

At block 428, the video capture update message may be sent to the predicted camera. For example, the surveillance controller may send or rout the generated message to the predicted camera based on a camera identifier and/or corresponding network address.

At block 430, the other video camera may receive the video capture update message. For example, the predicted and selected camera may receive the message from the surveillance controller through its network interface.

At block 432, video capture operations may be modified based on the video capture update message. For example, responsive to the message, the receiving video camera may change one or more parameters to implement a different set of video capture operating parameters.

At block 434, video data may be captured by the other video camera based on the modified video capture operations. For example, following the modification of the set of video capture operating parameters, the receiving video camera may operate for some operating period using the new parameters in order to more reliably detect the object of interest if and when it enters its field of view.

Figure 5:
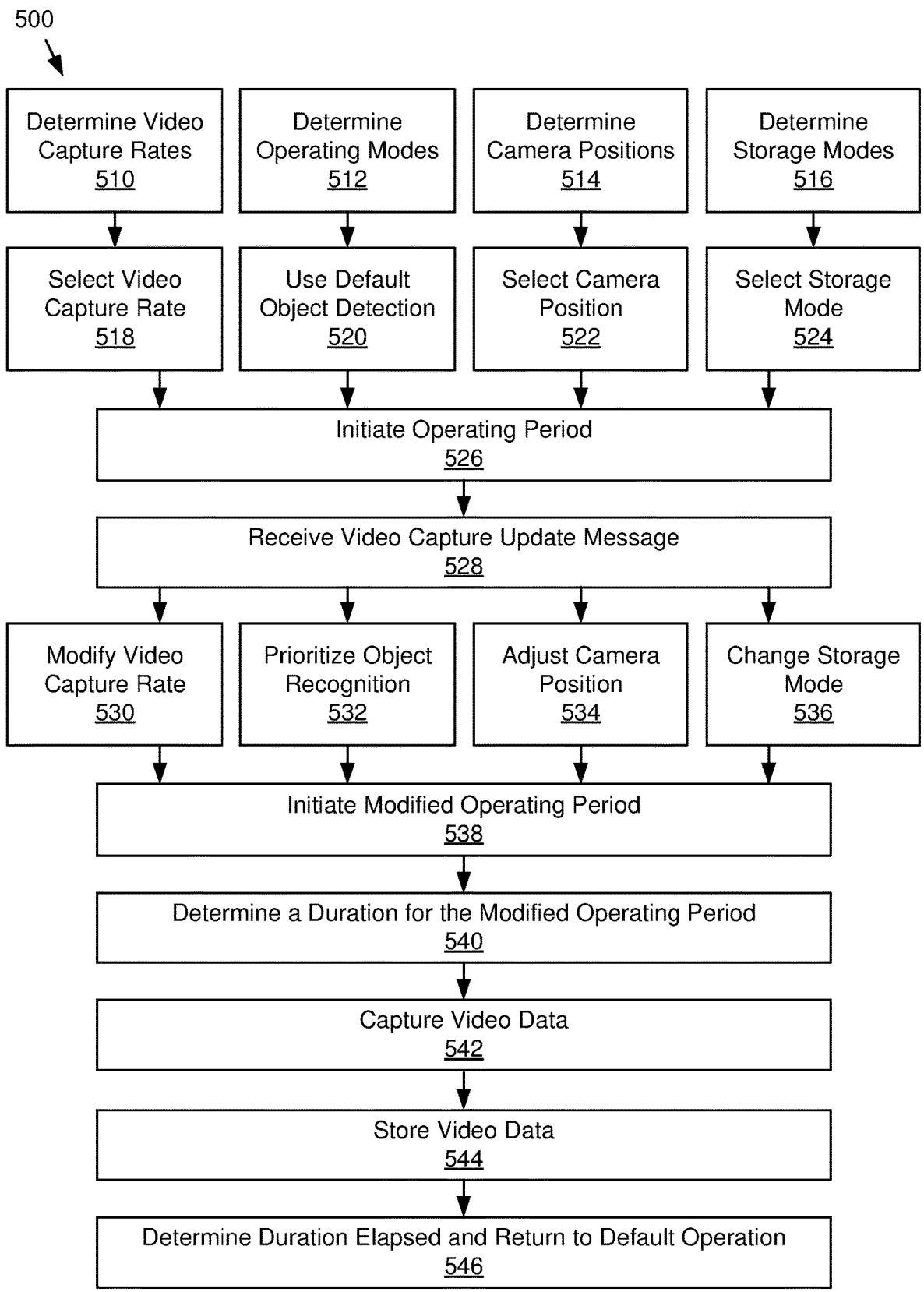
FIG. 5 is a flowchart of an example method of modifying video capture operations based on a video capture update message from an event detected by another camera.

As shown in FIG. 5, surveillance system 300 may be operated according to an example method for modifying video capture operations based on a video capture update message from an event detected by another camera, i.e., according to method 500 illustrated by blocks 510-546 in FIG. 5. In some embodiments, method 500 may operate in conjunction with one or more blocks of method 400 in FIG. 4.

At block 510, video capture rates may be determined. For example, a video camera may be configured at manufacture or based on user settings with multiple video capture rates supporting different operating modes of the video camera.

At block 512, operating modes may be determined. For example, the video camera may be configured at manufacture or based on user settings with multiple operating modes that may include a default operating mode with a set of video capture operating parameters.

At block 514, multiple camera positions may be determined. For example, upon installation, a video camera configured with PTZ functions enabled may determine ranges for pan, tilt, and/or zoom functions and the corresponding camera positions based on continuous and/or step adjustments.

At block 516, storage modes may be determined. For example, upon system configuration, two or more storage locations for video data from the video camera may be determined, such as local storage in a flash memory of the video camera (in a first mode), storage to one or more disk drives in a network video recorder (in a second mode), and/or network video storage in a remote cloud video storage system (in a third mode).

At block 518, a video capture rate may be selected. For example, upon initialization, the video camera may default to a video capture rate, such as a passive video capture rate.

At block 520, a default object detection mode may be used. For example, upon initialization, the video camera may be configured to use a low-weight object detector operating on lower quality video data and/or a motion sensor or video trip wire until a possible video event is detected.

At block 522, a camera position may be determined. For example, upon initialization or as determined by a user, the video camera may be placed in a default or last used position using the PZT controls.

At block 524, one or more initial storage modes may be determined. For example, upon initialization or based on default operating mode, the camera may default to a storage location, such as on-camera non-volatile memory.

At block 526, an operating period may be initiated. For example, the camera may enter a default operating mode with an associated set of video capture operating parameters selected based on blocks 518-524.

At block 528, a video capture update message may be received. For example, based on another video camera detecting a video event for a moving object of interest and predicting that the field of view of this camera would be likely to intercept the path of the object of interest in the future, this video camera may receive a notification message to predictively change its video capture operating parameters to increase the likelihood of detecting the object of interest.

At block 530, the video capture rate may be modified. For example, the camera may switch from a passive video capture rate to an active video capture rate.

At block 532, object detection, classification, and/or recognition may be prioritized. For example, the camera may redirect processing resources to a higher weight object detector and/or object classifiers or object recognition models capable of matching detected objects in this camera's field of view with the object of interest previously detected by the initial camera.

At block 534, the camera position may be adjusted. For example, the camera may use PZT control to move the field of view toward the likely direction of approach and/or intercept with this camera's field of view.

At block 536, a storage mode may be changed. For example, the camera may direct the captured video to one or more off-camera storage locations for video data storage, analysis, and/or display.

At block 538, a next operating period may be initiated. For example, based on the modifications to the video capture operations selected at blocks 530-536, a next operating period may begin using those selections.

At block 540, a duration for the modified operating period may be determined. For example, the video camera may receive a duration to monitor for the object of interest and set a predictive capture timer to measure the elapsed time to the duration.

At block 542, video data may be captured. For example, during the current operating period, the video camera may use the modified video capture operations to capture video data from the video image sensor.

At block 544, video data may bs stored. For example, during the current operating period, the video camera may send and store the captured video data for the modified video data operations.

At block 546, the duration for modified video capture operations may be determined to have elapsed and the video camera may return to default video capture operating parameters. For example, if the predetermined duration is met without detecting the object of interest, the video camera may return to block 526 to initiate another operating period with the original set of video capture operating parameters.

Figure 6:
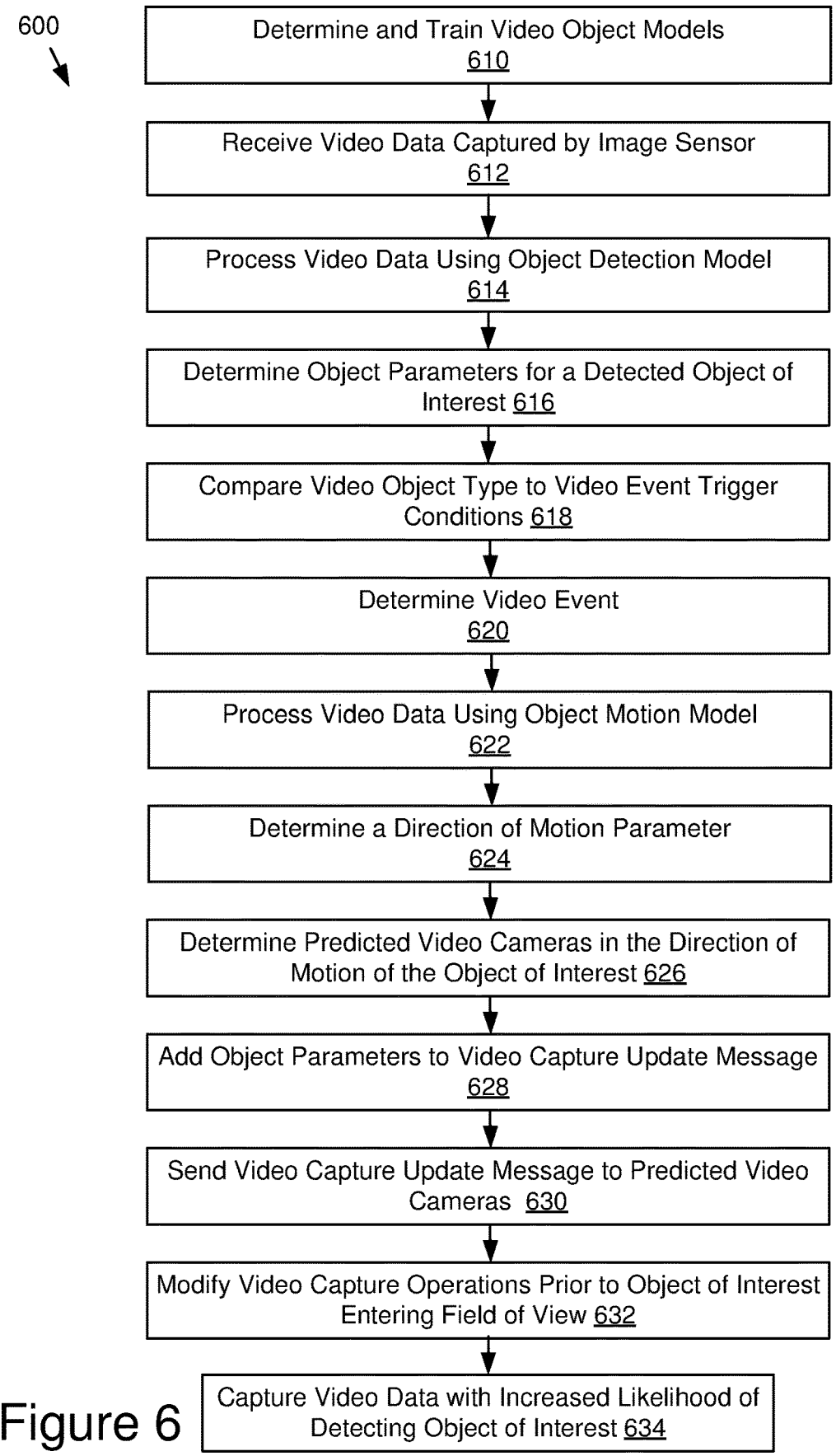
FIG. 6 is a flowchart of an example method of predictively modifying object detection based on a video capture update message.

As shown in FIG. 6, surveillance system 300 may be operated according to an example method for predictively modifying object detection based on a video capture update message, i.e., according to method 600 illustrated by blocks 610-634 in FIG. 6. In some embodiments, method 600 may operate in conjunction with one or more blocks of method 400 in FIG. 4 and/or method 500 in FIG. 5.

At block 610, one or more object models may be determined and trained. For example, an analytics engine may select at least one object detection model trained for detecting at least one object type from video data and may further select and train related object classification, object recognition, and object motion models for further processing of video data with an object of interest.

At block 612, video data captured by the image sensor of a camera may be received. For example, the analytics engine may receive video data for real-time or near real-time analysis from an associated video camera.

At block 614, the video data may be processed using an object detection model. For example, the analytics engine may process received video data through at least one object detection model (which may include a multi-class object detection model) and compare a confidence value from the model to an object detection threshold to determine that an object has been detected.

At block 616, the object parameters may be determined for a detected object of interest. For example, the object detection model may have an associated object type and/or output a determined object type (if it is multi-class model), a bounding box for the detected object, and a confidence value for the object detection as object parameters.

At block 618, video object type may be compared to video event trigger conditions to identify video events. For example, a surveillance controller may include video event trigger criteria based on object type and/or other object parameters, which may be combined with other parameters, such as time of day, environmental conditions, etc., to determine whether a video event condition should be instantiated to initiate further processing and response to the video event.

At block 620, a video event may be determined. For example, the surveillance controller may determine that the detected object is an object of interest that should initiate a video event for further action by the system, such as changes in video capture operations, event logging, notification to a user device, and/or additional processing and storage.

At block 622, video data may be processed using an object motion model. For example, the analytics engine may, using an object motion model such as an object tracking model, process a series of frames following the frame in which the object was initially detected to evaluate the motion of the object based on changes in location and size of the object from frame to frame.

At block 624, a direction of motion parameter may be determined for the object of interest. For example, object motion model may be configured to output a direction of motion parameter, such as a vector, for the object's motion through the frame, which may then be mapped to a direction of travel vector based on a spatial model of the surveillance environment and field of view of the camera.

At block 626, predicted video cameras in the direction of motion for the object of interest may be determined. For example, based on a comparison of the direction of motion parameter and the known spatial relationships among the cameras (which may also be parameterized in one or more vectors), one or more other cameras may be identified as predicted cameras to have the object of interest enter their fields of view in the future.

At block 628, object parameters may be added to a video capture update message. For example, the surveillance controller may generate a video capture update message for each predicted camera and include a set or subset of object parameters in the content of the message, which may include the video data corresponding to the contents of the bounding box from at least one frame containing the object of interest.

At block 630, the video capture update message may be sent to the predicted video cameras. For example, the surveillance controller may send the message to the predicted video cameras over the network using their respective camera identifiers and/or corresponding network addresses.

At block 632, video capture operations may be modified prior to the object of interest entering the fields of view of the predicted cameras. For example, the receiving cameras may proactively change video capture operating parameters even though the object of interest has not entered their field of view and is not yet detectable from their video data.

At block 634, capture video data at the predicted cameras with increased likelihood of detecting the object of interest. For example, the receiving cameras may use their modified video capture operating parameters to capture video data for object detection and recognition processing, which may include correlation analysis between the objects detected by the predicted camera and the received object parameters in the video capture update message.

Figure 7:
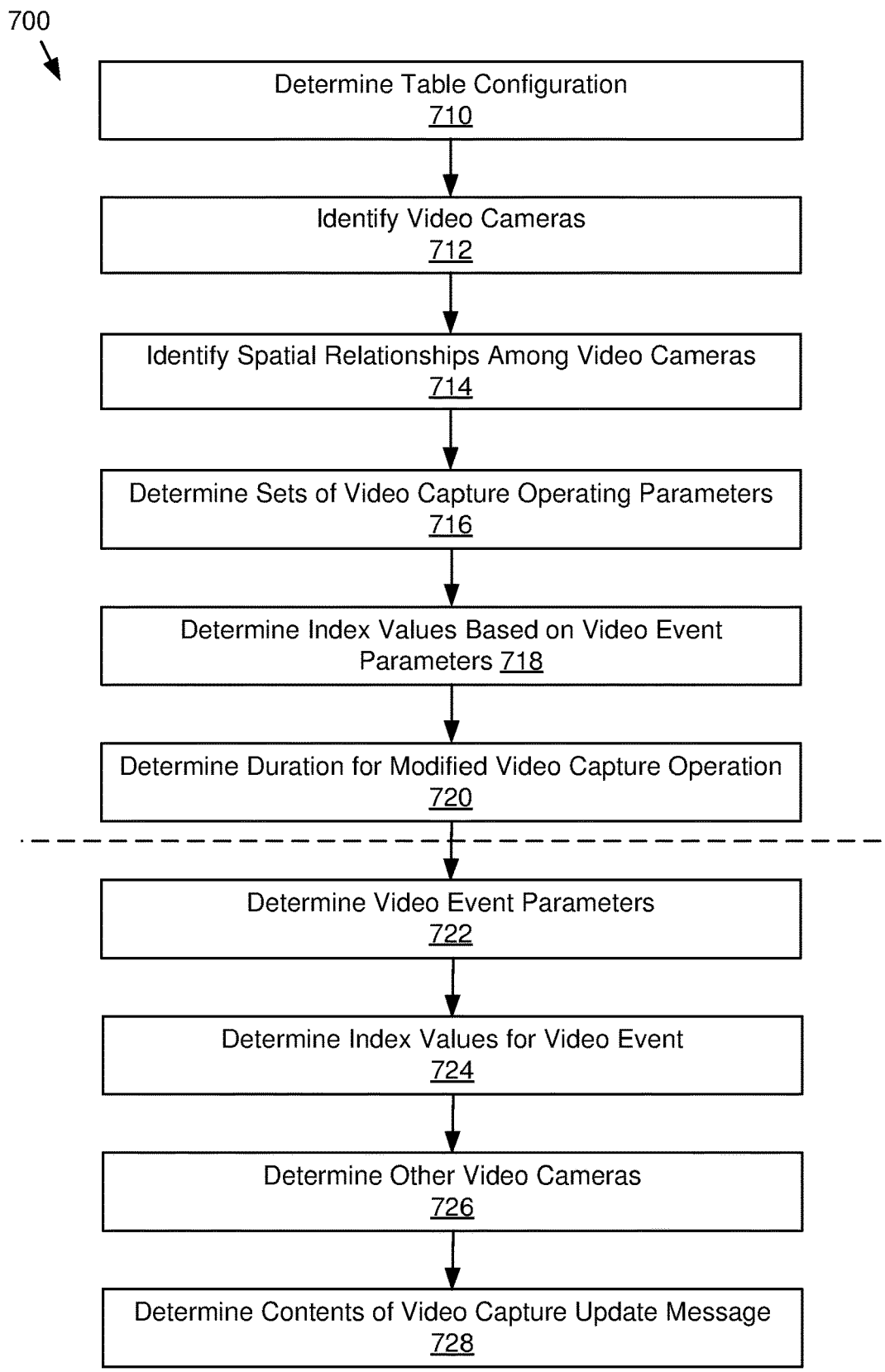
FIG. 7 is a flowchart of an example method of configuring and using a neighborhood table to process video events for each video camera.

As shown in FIG. 7, surveillance system 300 may be operated according to an example method for configuring and using a neighborhood table to process video events for each video camera, i.e., according to method 700 illustrated by blocks 710-728 in FIG. 7. In some embodiments, method 700 may operate in conjunction with one or more blocks of method 400 of FIG. 4, method 500 in FIG. 5, and/or method 600 in FIG. 6. Blocks 710-720 may correspond to a configuration phase for the neighborhood table and blocks 722-728 may correspond to an operating phase after deployment of the neighborhood table into runtime operation.

At block 710, a table configuration may be determined. For example, each camera may be configured with a neighborhood table that maps that camera's position to each other camera's position and corresponding sets of video capture operating parameters or a shared surveillance controller may include a combined neighborhood table with all cameras and camera-to-camera position combinations.

At block 712, video cameras may be identified. For example, the table (or tables) may be configured for each video camera as an initial video event detecting camera and as a possible predicted camera for future detection and use video camera identifiers for designating camera pairs in each entry.

At block 714, spatial relationships may be identified among video cameras. For example, the positions and fields of view of each camera may be mapped and spatial relationships between each pair of cameras may be parameterized as a vector or set of vectors for direction and distance between the cameras and/or fields of view (which may include a range for each field of view for cameras with PTZ control). These spatial relationship parameters may be stored in corresponding entries for the camera pairs in the table.

At block 716, sets of video capture operating parameters may be determined. For example, for each combination of detecting camera and predicted camera, at least one set of video capture operating parameters may be configured in table entries indicating changes from the default operating parameters of the predicted camera and corresponding to the object type and spatial relationship between the cameras.

At block 718, index values may be determined based on video event parameters. For example, index values that combine the object type and direction of motion of an object of interest may be configured for combinations of object type, direction of motion, and detecting camera that correspond to a likely movement path (based on the spatial relationship between a camera pair) that would predict.

At block 720, a duration parameter for the modified video capture operation of the predicted cameras may be determined. For example, a fixed or variable duration parameter may be included in each entry based on the distance between the camera pairs and/or most likely travel path and may include a velocity factor in configurations where velocity of the object of interest is included in the video event parameters.

At block 722, video event parameters may be determined for an identified video event. For example, responsive to one of the cameras detecting and object of interest, a surveillance controller may determine a set of video event parameters derived from the detected object parameters and related video metadata.

At block 724, index values may be determined for the video event. For example, the detecting camera, object type, and direction of motion may provide a set of index values for finding one or more relevant entries in the neighborhood table.

At block 726, other video cameras may be determined. For example, each entry in the neighborhood table identified by the index values may correspond to a predicted video camera that may receive the object of interest in its field of view in the future.

At block 728, the contents of the video capture update message may be determined. For example, based on the neighborhood table entry for the combination of index value and predicted camera identifier, a set of video capture operating parameters to modify, a duration parameter, and related video event parameters, which may include object parameters, may be populated within the contents of a video capture update message for that predicted camera.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system, comprising:
a first video camera having a first field of view, wherein a plurality of networked video cameras includes the first video camera; and
a controller in communication with the plurality of networked video cameras and configured to:
receive video data from the first video camera;
determine, from the video data, a first video event;
determine, based on video event parameters for the first video event, at least one other video camera from the plurality of networked video cameras, wherein the at least one other video camera does not have an overlapping field of view with the first video camera; and
send, to the at least one other video camera and based on the first video event, a video capture update message comprising at least one frame from video data corresponding to the first video event, wherein the at least one other video camera is configured to, responsive to the video capture update message:
modify a video capture operation of the at least one other video camera;
capture, using the at least one other video camera, video data based on the modified video capture operation; and
process video data from the modified video capture operation through an object recognition model, wherein the object recognition model uses the at least one frame received in the video capture update message as object recognition reference data.

2. The system of claim 1, wherein:
the at least one other video camera is configured for a plurality of video capture rates; and
modifying the video capture operation comprises:
operating, during a first operating period, at a first video capture rate from the plurality of video capture rates; and
selecting, responsive to the video capture update message and during a second operating period, a second video capture rate to modify the video capture operation.

3. The system of claim 1, wherein:
the at least one other video camera includes an actuator configured to adjust a direction of a field of view of the at least one other video camera; and
modifying the video capture operation comprises:
operating, during a first operating period, in a first position of a plurality of positions for adjusting the direction of the field of view; and
selecting, responsive to the video capture update message and during a second operating period, a second position of the plurality of positions.

4. The system of claim 1, wherein:
the at least one other video camera includes a plurality of storage modes for storing video data to a non-volatile storage medium; and
modifying the video capture operation comprises:
operating, during a first operating period, in a first storage mode of the plurality of storage modes; and
selecting, responsive to the video capture update message and during a second operating period, a second storage mode of the plurality of storage modes.

5. The system of claim 1, wherein:
the at least one other video camera comprises a plurality of sets of video capture operating parameters;
the at least one other video camera is further configured to use a first set of video capture operating parameters during a first operating period; and
modifying the video capture operation comprises:
determining a duration for a second operating period for determining, from video data of the at least one other video camera, a second video event related to the first video event; and
selecting, responsive to the video capture update message and during the second operating period, a second set of video capture operating parameters.

6. The system of claim 1, wherein:
determining the first video event comprises detecting, using an object detection model, an object of interest in the video data;
determining the at least one other video camera from the plurality of networked video cameras comprises:
determining a set of object parameters for the object of interest; and
using the set of object parameters to select the at least one other video camera from the plurality of networked video cameras; and
modifying the video capture operation of the at least one other video camera occurs prior to the object of interest entering a field of view of the at least one other video camera.

7. The system of claim 6, wherein:
the video capture update message comprises the set of object parameters for the object of interest; and
modifying the video capture operation comprises modifying, based on the set of object parameters, a set of video capture operating parameters to increase a likelihood of detecting the object of interest.

8. The system of claim 1, wherein the controller is further configured to:
determine a set of video event parameters from the first video event;
search a data structure for at least one index value corresponding to a set of video event parameters for the first video event to determine at least one entry in the data structure;
determine, based on the at least one entry, at least one camera identifier for the at least one other video camera; and
determine, based on the at least one entry, at least one set of video capture operating parameters to include in the video capture update message.

9. The system of claim 1, wherein:
the video event parameters for the first video event include:
an object type parameter; and
a direction of motion parameter; and
the direction of motion parameter is used to determine:
the at least one other video camera; and
a set of video capture operating parameters from a plurality of sets of video capture operating parameters for the at least one other video camera.

10. The system of claim 1, further comprising:
a data structure configured to:
identify the plurality of networked video cameras;
identify spatial relationships among the plurality of networked video cameras;
identify a plurality of sets of video capture operating parameters for each video camera of the plurality of networked video cameras; and
use an index value based on video event parameters, wherein the controller is further configured to use the data structure to determine, based on video event parameters for the first video event:
the at least one other video camera; and
contents of the video capture update message.

11. A computer-implemented method, comprising:
receiving video data from a first video camera of a plurality of networked video cameras;
determining, from the video data, a first video event;
determining, based on the first video event, at least one other video camera from the plurality of networked video cameras, wherein the at least one other video camera does not have an overlapping field of view with the first video camera;
sending, to the at least one other video camera and based on the first video event, a video capture update message, wherein the video capture update message comprises at least one frame from video data corresponding to the first video event; and
responsive to the video capture update message:
modifying a video capture operation of the at least one other video camera;
capturing, using the at least one other video camera, video data based on the modified video capture operation; and
processing video data from the modified video capture operation through an object recognition model, wherein the object recognition model uses the at least one frame received in the video capture update message as object recognition reference data.

12. The computer-implemented method of claim 11, wherein:
the at least one other video camera is configured for a plurality of video capture rates; and
modifying the video capture operation comprises:
operating, during a first operating period, at a first video capture rate from the plurality of video capture rates; and
selecting, responsive to the video capture update message and during a second operating period, a second video capture rate to modify the video capture operation.

13. The computer-implemented method of claim 11, wherein:
the at least one other video camera includes an actuator configured to adjust a direction of a field of view of the at least one other video camera; and modifying the video capture operation comprises:
operating, during a first operating period, in a first position of a plurality of positions for adjusting the direction of the field of view; and
selecting, responsive to the video capture update message and during a second operating period, a second position of the plurality of positions.

14. The computer-implemented method of claim 11, wherein:
the at least one other video camera includes a plurality of storage modes for storing video data to a non-volatile storage medium; and
modifying the video capture operation comprises:
operating, during a first operating period, in a first storage mode of the plurality of storage modes; and
selecting, responsive to the video capture update message and during a second operating period, a second storage mode of the plurality of storage modes.

15. The computer-implemented method of claim 11, wherein:
the at least on other video camera comprises a plurality of sets of video capture operating parameters;
the at least one other video camera is further configured to use a first set of video capture operating parameters during a first operating period; and
modifying the video capture operation comprises:
determining a duration for a second operating period for determining, from video data of the at least one other video camera, a second video event related to the first video event; and
selecting, responsive to the video capture update message and during the second operating period, a second set of video capture operating parameters.

16. The computer-implemented method of claim 11, wherein:
determining the first video event comprises detecting, using an object detection mode, an object of interest in the video data;
determining the at least one other video camera from the plurality of networked video cameras comprises:
determining a set of object parameters for the object of interest; and
using the set of object parameters to select the at least one other video camera from the plurality of networked video cameras; and
modifying the video capture operation of the at least one other video camera occurs prior to the object of interest entering a field of view of the at least one other video camera.

17. The computer-implemented method of claim 16, wherein:
the video capture update message comprises the set of object parameters for the object of interest; and
modifying the video capture operation comprises modifying, based on the set of object parameters, a set of video capture operating parameters to increase a likelihood of detecting the object of interest.

18. The computer-implemented method of claim 11, further comprising:
indexing, using video event parameters, a data structure configured to:
identify the plurality of networked video cameras;
identify spatial relationships among the plurality of networked video cameras; and
identify a plurality of sets of video capture operating parameters for each video camera of the plurality of networked video cameras; and using the data structure to determine, based on video event parameters for the first video event:
the at least one other video camera; and
contents of the video capture update message.

19. The computer-implemented method of claim 18, wherein:
the video event parameters for the first video event include:
an object type parameter; and
a direction of motion parameter; and
the direction of motion parameter is used to determine, based on the data structure:
the at least one other video camera; and
a set of video capture operating parameters from the plurality of sets of video capture operating parameters for the at least one other video camera.

20. A system, comprising:
a plurality of networked video cameras;
a processor;
a memory;
means for receiving video data from a first video camera of the plurality of networked video cameras;
means for determining, from the video data, a first video event;
means for determining, based on video event parameters for the first video event, at least one other video camera from the plurality of networked video cameras, wherein the at least one other video camera does not have an overlapping field of view with the first video camera;
means for sending, to the at least one other video camera and based on the first video event, a video capture update message comprising at least one frame from video data corresponding to the first video event;
means for modifying, responsive to the video capture update message, a video capture operation of the at least one other video camera;
means for capturing, using the at least one other video camera, video data based on the modified video capture operation; and
means for processing video data from the modified video capture operation through an object recognition model, wherein the object recognition model uses the at least one frame received in the video capture update message as object recognition reference data.

* * * * *